(12) United States Patent
Bonefas

(10) Patent No.: US 9,861,040 B2
(45) Date of Patent: *Jan. 9, 2018

(54) METHOD AND STEREO VISION SYSTEM FOR FACILITATING THE UNLOADING OF AGRICULTURAL MATERIAL FROM A VEHICLE

(71) Applicant: Deere & Company, Moline, IL (US)

(72) Inventor: Zachary T. Bonefas, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 740 days.

This patent is subject to a terminal disclaimer.

(21) Appl. No.: 13/763,288

(22) Filed: Feb. 8, 2013

(65) Prior Publication Data

US 2013/0213518 A1 Aug. 22, 2013

Related U.S. Application Data

(60) Provisional application No. 61/597,380, filed on Feb. 10, 2012.

(51) Int. Cl.
  A01D 75/00 (2006.01)
  A01D 43/073 (2006.01)
  A01D 43/08 (2006.01)

(52) U.S. Cl.
  CPC ........... *A01D 75/00* (2013.01); *A01D 43/073* (2013.01); *A01D 43/087* (2013.01)

(58) Field of Classification Search
  CPC .... A01D 43/073; A01D 43/087; A01D 75/00; A01D 41/00; A01D 45/00; G05D 1/0246; G05D 1/0293; G05D 2201/0201
  See application file for complete search history.

(56) References Cited

U.S. PATENT DOCUMENTS

| 5,524,424 A | 6/1996 | Halgrimson et al. |
| 5,575,316 A | 11/1996 | Pollklas |

(Continued)

FOREIGN PATENT DOCUMENTS

| DE | 4339441 A1 | 5/1995 |
| DE | 4403893 A1 | 8/1995 |

(Continued)

OTHER PUBLICATIONS

Borthwick, James Robert; Mining Haul Truck Pose Estimation and Load Profiling Using Stereo Vision. Aug. 2009. The University of British Columbia (Vancouver).

(Continued)

*Primary Examiner* — Timothy L Maust
*Assistant Examiner* — Andrew StClair

(57) ABSTRACT

A spout is operably connected to a transferring material for transferring the agricultural material to the receiving vehicle. An imaging device faces towards the storage portion of the receiving vehicle and collects image data. A container module is adapted to determine a container position of the storage portion, or its container perimeter. A spout module is adapted to identify a spout of the transferring vehicle in the collected image data, or to determine a spout position. An alignment module is adapted to determine the relative position of the spout and the container position based on the collected image data and to generate command data or user interface data to facilitate placement of the spout and storage container in relative cooperative alignment for transferring of material from the transferring vehicle to the receiving vehicle.

19 Claims, 17 Drawing Sheets

(56) References Cited

U.S. PATENT DOCUMENTS

| | | | |
|---|---|---|---|
| 5,621,645 A * | 4/1997 | Brady | G08G 1/04 340/903 |
| 5,646,844 A | 7/1997 | Gudat et al. | |
| 5,712,782 A | 1/1998 | Weigelt et al. | |
| 5,749,783 A | 5/1998 | Pollklas | |
| 5,751,576 A | 5/1998 | Monson | |
| 6,216,071 B1 | 4/2001 | Motz | |
| 6,591,145 B1 | 7/2003 | Hoskinson et al. | |
| 6,682,416 B2 * | 1/2004 | Behnke | A01B 69/008 141/231 |
| 6,687,616 B1 | 2/2004 | Peterson et al. | |
| 6,732,024 B2 | 5/2004 | Wilhelm Rekow et al. | |
| 6,943,824 B2 * | 9/2005 | Alexia | A01D 43/073 348/120 |
| 7,277,784 B2 | 10/2007 | Weiss | |
| 7,537,519 B2 | 5/2009 | Huster et al. | |
| 7,648,413 B2 | 1/2010 | Duquesne et al. | |
| 8,060,283 B2 | 11/2011 | Mott et al. | |
| 8,380,401 B2 | 2/2013 | Pighi et al. | |
| 8,428,829 B2 | 4/2013 | Brunnert et al. | |
| 8,656,693 B2 | 2/2014 | Madsen et al. | |
| 8,868,304 B2 | 10/2014 | Bonefas | |
| 2003/0086614 A1 * | 5/2003 | Shen | G06T 1/20 382/199 |
| 2003/0217539 A1 | 11/2003 | Grossjohann et al. | |
| 2005/0191050 A1 * | 9/2005 | Chapman | B60R 11/04 396/428 |
| 2007/0003107 A1 * | 1/2007 | Wei | A01B 69/008 382/104 |
| 2009/0044505 A1 * | 2/2009 | Huster | A01D 43/087 56/10.2 R |
| 2009/0099775 A1 | 4/2009 | Mott et al. | |
| 2009/0222160 A1 | 9/2009 | Morselli et al. | |
| 2010/0063692 A1 * | 3/2010 | Madsen | A01D 43/073 701/50 |
| 2010/0108188 A1 | 5/2010 | Correns et al. | |
| 2010/0274452 A1 | 10/2010 | Ringwald et al. | |
| 2010/0332051 A1 * | 12/2010 | Kormann | A01F 12/46 701/2 |
| 2011/0022273 A1 * | 1/2011 | Peters | G05D 1/0287 701/42 |
| 2011/0061762 A1 | 3/2011 | Madsen et al. | |
| 2011/0066337 A1 | 3/2011 | Kormann | |
| 2011/0205084 A1 | 8/2011 | Morselli et al. | |
| 2011/0307149 A1 * | 12/2011 | Pighi | A01D 41/127 701/50 |
| 2012/0263560 A1 | 10/2012 | Diekhans et al. | |
| 2013/0045067 A1 | 2/2013 | Pickett et al. | |
| 2013/0213518 A1 | 8/2013 | Bonefas | |
| 2014/0350801 A1 | 11/2014 | Bonefas | |
| 2015/0023775 A1 | 1/2015 | Bonefas et al. | |
| 2015/0109410 A1 | 4/2015 | Bonefas et al. | |
| 2015/0356722 A1 | 12/2015 | Bonefas | |
| 2015/0378359 A1 | 12/2015 | Bonefas et al. | |
| 2016/0009509 A1 | 1/2016 | Bonefas | |

FOREIGN PATENT DOCUMENTS

| | | |
|---|---|---|
| DE | 102007009666 A1 | 8/2008 |
| DE | 102011005400 A1 | 9/2012 |
| DE | 102014108449 A1 | 2/2015 |
| EP | 2138027 A1 | 12/2009 |
| EP | 2361494 A1 | 8/2011 |
| EP | 2301318 B1 | 11/2011 |
| EP | 2311307 B1 | 12/2011 |
| EP | 2020174 B1 | 2/2012 |
| GB | 2517049 A | 2/2015 |
| JP | 2177815 A | 7/1990 |
| WO | 2011101458 A1 | 8/2011 |

OTHER PUBLICATIONS

Singh, Sanjiv; and Digney, Bruce; Autonomous Cross-Country Navigation Using Stereo Vision. Jan. 1999. Carnegie Mellon University. Pittsburgh, PA.

AgCam Photo Album [online]. 2009 [retrieved on Oct. 3, 2012]. Retrieved from the Internet: <URL: http://dakotamicro.com/docs/AgCam Photo Album.pdf>.

CLAAS, Agritechnica 2009; Two Golds and a Silver for CLAAS [online], 2009 [retrieved on Oct. 3, 2012]. Retrieved from the Internet: <URL: http://www.claas.com/cl-gr/en/press/mitteilungen/2009/start,%20cid=565120,bpSite=35108,lang=en_UK.html>.

The International Search Report and the Written Opinion of the International Searching Authority, dated Apr. 15, 2013 (19 pages).

The International Search Report and the Written Opinion of the International Searching Authority, dated Apr. 17, 2013 (11 pages).

European Search Report issued in counterpart application No. 13746245.3, dated Aug. 25, 2015 (7 pages).

* cited by examiner

METHOD AND STEREO VISION SYSTEM FOR FACILITATING THE UNLOADING OF AGRICULTURAL MATERIAL FROM A VEHICLE

RELATED APPLICATION

This application claims the benefit of the filing date of and priority to U.S. Provisional Application Ser. No. 61/597,380, filed Feb. 10, 2012, which is incorporated herein by reference in its entirety.

JOINT RESEARCH AGREEMENT

This application resulted from work performed under or related to a joint research agreement between Carnegie Mellon University and Deere & Company, entitled "Development Agreement between Deere & Company and Carnegie Mellon University," dated Jan. 1, 2008 and as such is entitled to the benefits available under 35 U.S.C. §103(c).

FIELD OF THE INVENTION

This invention relates to a method and stereo vision system for facilitating the unloading or transferring of agricultural material from a vehicle.

BACKGROUND

Certain prior art systems may attempt to use global positioning system (GPS) receivers to maintain proper spacing between two vehicles during the unloading or transferring of agricultural material between the vehicles. However, such prior art systems are susceptible to misalignment of the proper spacing because of errors or discontinuities in the estimated position of the GPS receivers. For example, one or more of the GPS receivers may misestimate its position because of electromagnetic interference, multipath propagation of the received satellite signals, intermittent reception of the satellite signals or low received signal strength of the satellite signals, among other things. If the vehicles use cameras or other imaging devices in an outdoor work area, such as an agricultural field, the imaging devices may be subject to transitory sunlight, shading, dust, reflections or other lighting conditions that can temporarily disrupt proper operation of the imaging devices; hence, potentially produce errors in estimated ranges to objects observed by the imaging devices. Thus, there is a need for an improved system for managing the unloading of agricultural material from a vehicle to compensate for or address error in the estimated positions or alignment of the vehicles.

SUMMARY OF THE INVENTION

The system and method facilitates the transfer of agricultural material from a transferring vehicle (e.g., harvesting vehicle) to a receiving vehicle (e.g., grain cart). The system and method comprises a receiving vehicle, which has a propelled portion for propelling the receiving vehicle and a storage portion for storing agricultural material. A spout is operably connected to a transferring material for transferring the agricultural material to the receiving vehicle. An imaging device faces towards the storage portion of the receiving vehicle and collects image data. A container module is adapted to determine a container position of the storage portion, or its container perimeter (e.g., via a trailer tongue angle between the propelled portion and the storage portion, a heading of the propelled portion, and a position of the propelled portion; or via the collected image data). A spout module is adapted to identify a spout of the transferring vehicle in the collected image data, or to determine a spout position. An alignment module is adapted to determine the relative position of the spout and the container position based on the collected image data and to generate command data (e.g., to steer the propelled portion) or user interface data to facilitate placement of the spout and storage portion in relative cooperative alignment for transferring of material from the transferring vehicle to the receiving vehicle (e.g., such that the spout is aligned within a target zone or central zone of the storage portion inside the container perimeter).

DESCRIPTION OF THE PREFERRED EMBODIMENT

Figure 1:
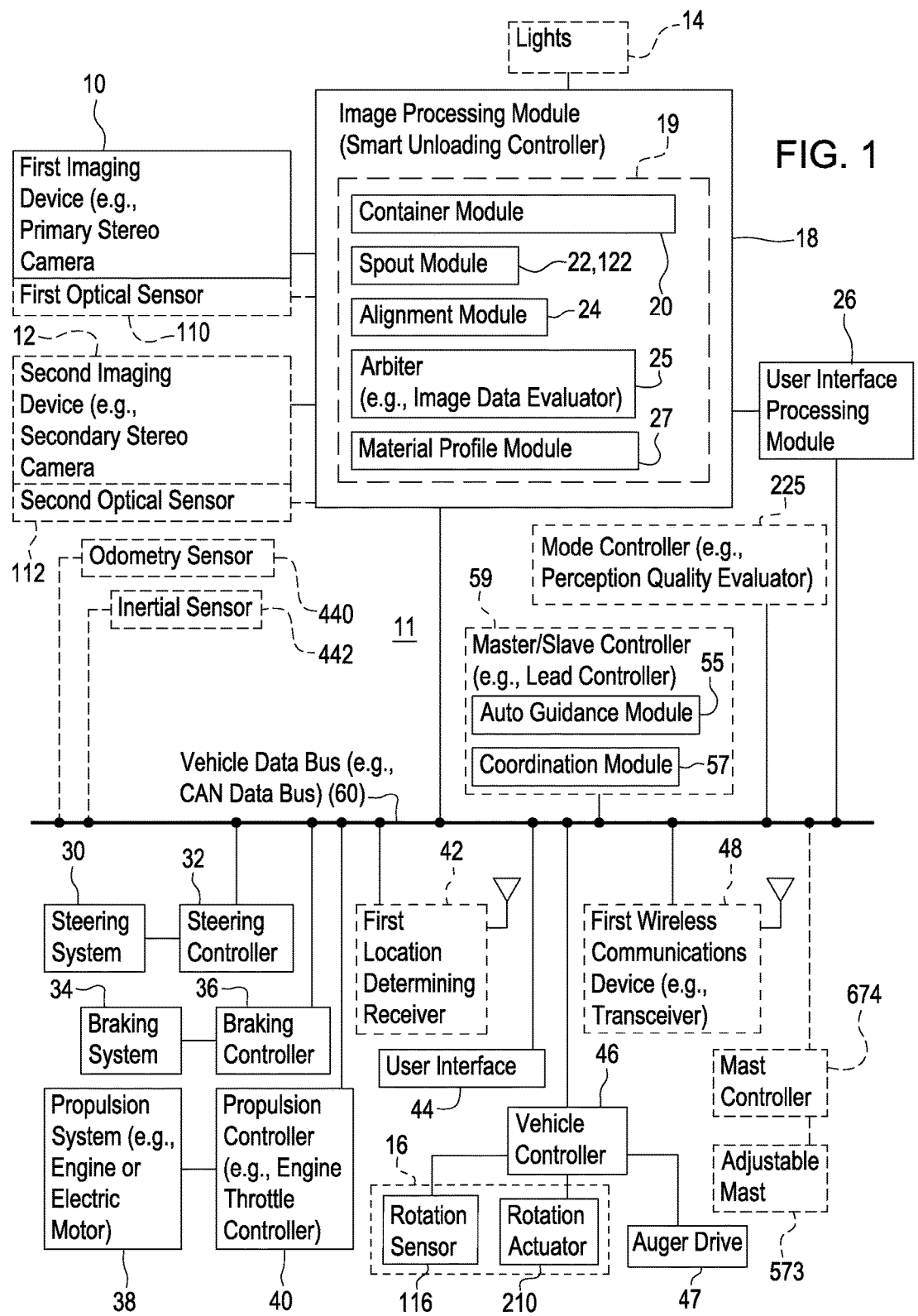
FIG. 1 is a block diagram of one embodiment of a machine vision-augmented guidance system for a transferring vehicle for facilitating the unloading or transferring of agricultural material from the transferring vehicle (e.g., combine).

In accordance with one embodiment, FIG. 1 shows a machine vision-augmented guidance system 11 for a transferring vehicle for managing the unloading of agricultural material (e.g., grain) from the transferring vehicle (e.g., combine) to a receiving vehicle (e.g., grain cart or wagon). A transferring vehicle may have a spout for directing agricultural material toward a storage portion of the receiving vehicle. For example, a stereo imaging system augments satellite navigation receivers or location-determining receivers (42, 142) for guidance of one or more vehicles. In one embodiment, the system 11 comprises a first imaging device 10 and an optional second imaging device 12 coupled to an image processing module 18. The first imaging device 10 may be mounted on the transferring vehicle. The first imaging device 10 may comprise a primary stereo camera, while the second imaging device 12 may comprise a secondary stereo camera. In one configuration, the second imaging device 12 or secondary stereo camera is optional and provides redundancy to the first imaging device 10 in case of failure, malfunction or unavailability of image data from the first imaging device 10.

The first imaging device 10 and the second imaging device 12 may provide digital data format output as stereo video image data or a series of stereo still frame images at regular or periodic intervals, or at other sampling intervals. Each stereo image (e.g., the first image data or the second image data) has two component images of the same scene or a portion of the same scene. For example, the first imaging device 10 has a first field of view of the storage portion of the receiving vehicle, where the first field of view overlaps at least partially with a second field of view of the second imaging device 12 (if present). In one embodiment, the first imaging device 10, the second imaging device 12, or both may comprise a charge-coupled device (CCD), a complementary metal-oxide semiconductor (CMOS) array, or another suitable device for detection or collection of image data.

In one configuration, an optical sensor (110, 112) comprises a light meter, a photo-sensor, photo-resistor, photo-sensitive device, or a cadmium-sulfide cell. A first optical sensor 110 may be associated with the first imaging device 10; a second optical sensor may be associated with the second imaging device 12. The first optical sensor 110 and the second optical sensor 112 each may be coupled to the image processing module 18. The optical sensor (110, 112) provides a reading or level indicative of the ambient light in the field of view of its respective imaging device (10, 12).

Figure 5A:
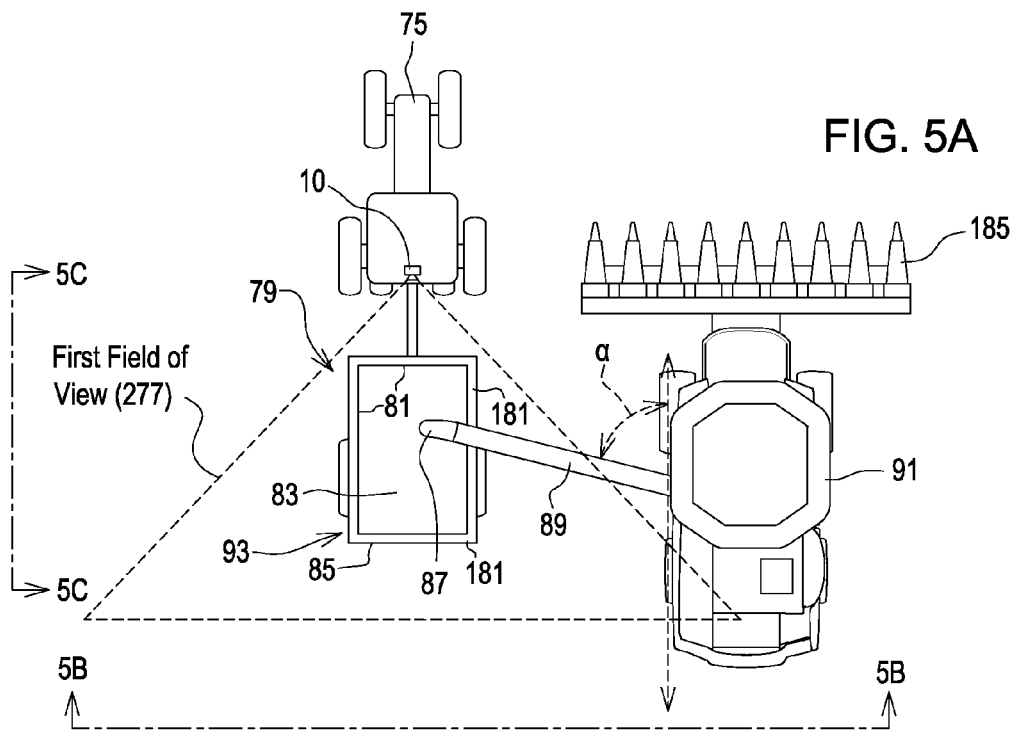
FIG. 5A illustrates a plan view of an imaging device (e.g., a stereo vision system) mounted on a receiving vehicle and facing a storage portion of the receiving vehicle.

The image processing module 18 may be coupled, directly or indirectly, to optional lights 14 on a vehicle (e.g., transferring vehicle) for illumination of a storage container (e.g., 85 in FIG. 5A) and/or spout (e.g., 89 in FIG. 5A). For example, the image processing module 18 may control drivers, relays or switches, which in turn control the activation or deactivation of optional lights 14 on the transferring vehicle. The optional lights 14 are shown in dashed lines because the lights 14 are optional and may be deleted in certain alternate embodiments. The image processing module 18 may activate the lights 14 on the vehicle for illumination of the storage container (e.g., 85 in FIG. 5A), spout 89 or both if an optical sensor (110, 112) or light meter indicates that an ambient light level is below a certain minimum threshold. In one configuration the optical sensor (110, 112) face toward the same direction as the lens or aperture of the imaging devices (10, 12).

In one embodiment, an auger rotation system 16 may comprise: (1) a rotation angle sensor 116 for sensing a spout rotation angle ($\alpha$ in FIG. 5A and $\beta$ in FIG. 5B) of the spout 89 with respect to one or more axes of rotation and (2) an actuator 210 for moving the spout 89 to change the spout rotation angle; hence, the spout position with respect to the receiving vehicle 79 or its storage container 85. The actuator 210 may comprise a motor, a linear motor, an electro-hydraulic device, a ratcheting or cable-actuated mechanical device, or another device for moving the spout 89, or the spout end 87. The spout rotation angle may comprise a simple angle, a compound angle or multi-dimensional angles that is measured with reference to a reference axis parallel to the direction of travel of the transferring vehicle. In one configuration, one or more of the following communicates with the vehicle controller 46 through transmission line or a secondary data bus: a rotation sensor 116, a rotation actuator 210, an auger rotation system 16, or an auger driver 47.

If the actuator 210 comprises an electro-hydraulic device, the use of proportional control valves in the hydraulic cylinder of the electro-hydraulic device that rotates the spout (or changes the spout rotation angle) facilitates finer adjustments to the spout angle (e.g., $\alpha$) than otherwise possible. Accordingly, proportional control valves of the electro-hydraulic device support or actuator 216 supports an even profile or distribution of unloaded agricultural material within the storage portion 93 or container 85. Many commercially available combines are typically equipped with non-proportional control valves for controlling spout angle or movement of the spout 89; electro-hydraulic devices with non-proportional control valves can fill the storage container with an inefficient multi-modal or humped distribution (e.g., 508) of agricultural material with local high areas and local low areas, as depicted in FIG. 5C, for example.

A vehicle controller 46 may be coupled to the vehicle data bus 60 to provide a data message that indicates when the auger drive 47 for unloading agricultural material from the transferring vehicle is activate and inactive. The auger drive 47 may comprise an auger, an electric motor for driving the auger, and a rotation sensor for sensing rotation or rotation rate of the auger or its associated shaft. In one embodiment, the auger (not shown) is associated with a container for storing agricultural material (e.g., a grain tank) of a transferring vehicle (e.g., a combine). If the vehicle controller 46 (e.g., auger controller) indicates that the auger of the transferring vehicle is rotating or active, the imaging processing module 18 activates the spout module 22 and container module 20. Thus, the auger rotation system 16, or its associated vehicle controller 46, may conserve data processing resources or energy consumption by placing the container module 20 and the spout module 22 in an inactive state (or standby mode) while the transferring vehicle is harvesting, but not unloading, the agricultural material to the receiving vehicle.

In FIG. 1, the imaging processing module 18 or any other controller may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. In one embodiment, the image processing module 18 comprises a container module 20, a spout module 22, an alignment module 24, a material profile module 27, and an arbiter 25. Each module may comprise a software module, an electronic module, or both, where the software module comprises software instructions for executing functions described in this document.

The image processing module 18 may be associated with a data storage device 19. The data storage device 19 may comprise electronic memory, non-volatile random access memory, a magnetic disc drive, an optical disc drive, a magnetic storage device or an optical storage device, for example. If the container module 20, the spout module 22 and the alignment module 24, material profile module 27 and arbiter 25, are software modules they can be stored within the data storage device 19.

The container module 20 identifies a set of two-dimensional or three dimensional points (e.g., in Cartesian coordinates or Polar coordinates) in the collected image data or in the real world that define a container position or at least a portion of the container perimeter (e.g., 81 in FIG. 5A) of the storage portion (e.g., 85 in FIG. 5A). The set of two-dimensional or three dimensional points correspond to pixel positions in images collected by the first imaging device 10, the second imaging device 12, or both. The container module 20 may use or retrieve container reference data.

The container reference data comprises one or more of the following: reference dimensions (e.g., length, width, height), volume, reference shape, drawings, models, layout, and configuration of the container 85, the container perimeter 81, the container edges 181; reference dimensions, reference shape, drawings, models, layout, and configuration of the entire storage portion 93 of receiving vehicle; storage portion wheelbase, storage portion turning radius, storage portion hitch configuration of the storage portion 93 of the receiving vehicle; and distance between hitch pivot point and storage portion wheelbase. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the transferring vehicle system 11. For each receiving vehicle identifier, there can be a corresponding unique container reference data stored therewith in the data storage device 19.

In one embodiment, the transferring vehicle receives a data message from the receiving vehicle in which a vehicle identifier of the receiving vehicle is regularly (e.g., periodically transmitted). In another embodiment, the transferring vehicle interrogates the receiving vehicle for its vehicle identifier or establishes a communications channel between the transferring vehicle and the receiving vehicle in preparation for unloading via the wireless communication devices (48, 148). In yet another embodiment, the receiving vehicle transmits its vehicle identifier to the transferring vehicle when the receiving vehicle approaches the transferring vehicle within a certain radial distance. In still another embodiment, only one known configuration of receiving vehicle is used with a corresponding transferring vehicle and the container reference data is stored or saved in the data storage device 19. In the latter embodiment, the transferring vehicle is programmed, at least temporarily, solely for receiving vehicles with identical containers, which are identical in dimensions, capacity, proportion and shape.

In one configuration, the container module 18 identifies the position of the controller as follows. If the linear orientation of a set of pixels in the collected image data conforms to one or more edges 181 of the perimeter (81 in FIG. 5A) of the container (85 in FIG. 5A) as prescribed by the container reference data, the position of the container has been identified. A target zone, central region or central zone of the container opening 83 of the container 85 can be identified by dividing (by two) the distance (e.g., shortest distance or surface normal distance) between opposite sides of the container, or by indentifying corners of the container and where diagonal lines that intercept the corners intersect, among other possibilities. In one configuration, the central zone may be defined as an opening (e.g., circular, elliptical or rectangular) in the container with an opening surface area that is greater than or equal to the cross-sectional surface area of the spout end by a factor of at least two, although other surface areas fall within the scope of the claims. In one configuration, the spout module 22 identifies one or more of the following: (1) the spout pixels on at least a portion of the spout 89 (in FIG. 5A), (2) spout end pixels that are associated with the spout end 87 of the spout 89 (in FIG. 5A), (3) spout pixels associated with a spout position on or for the spout 89 (in FIG. 5A). The spout module 22 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout 89 or on the spout end 87 of the spout 89 for identification purposes.

The alignment module 24, the master/slave controller 59, or both estimate or determine motion commands at regular intervals to maintain alignment of the spout (56 or 89) over the central zone, central region or target of the container 85 for unloading agricultural material. The alignment module 24, the master/slave controller 59, or both, may send commands or requests to the transferring vehicle with respect to its speed, velocity or heading to maintain alignment of the position of the transferring vehicle with respect to the receiving vehicle. For example, the alignment module 24 may transmit a request for a change in a spatial offset between the vehicles to the master/slave controller 59. In response, the master/slave controller 59 or the coordination module 57 transmits a steering command or heading command to the steering controller 32, a braking or deceleration command to a braking system 34, and a propulsion, acceleration or torque command to a propulsion controller 40 to achieve the target spatial offset or change in spatial offset. Further, similar command data may be transmitted via the wireless communication devices (48, 148) to the receiving vehicle for observational purposes or control of the receiving vehicle via its steering system controller 32, its braking controller 36, and its propulsion controller 40 of the system 311 of FIG. 3A.

Figure 3A:
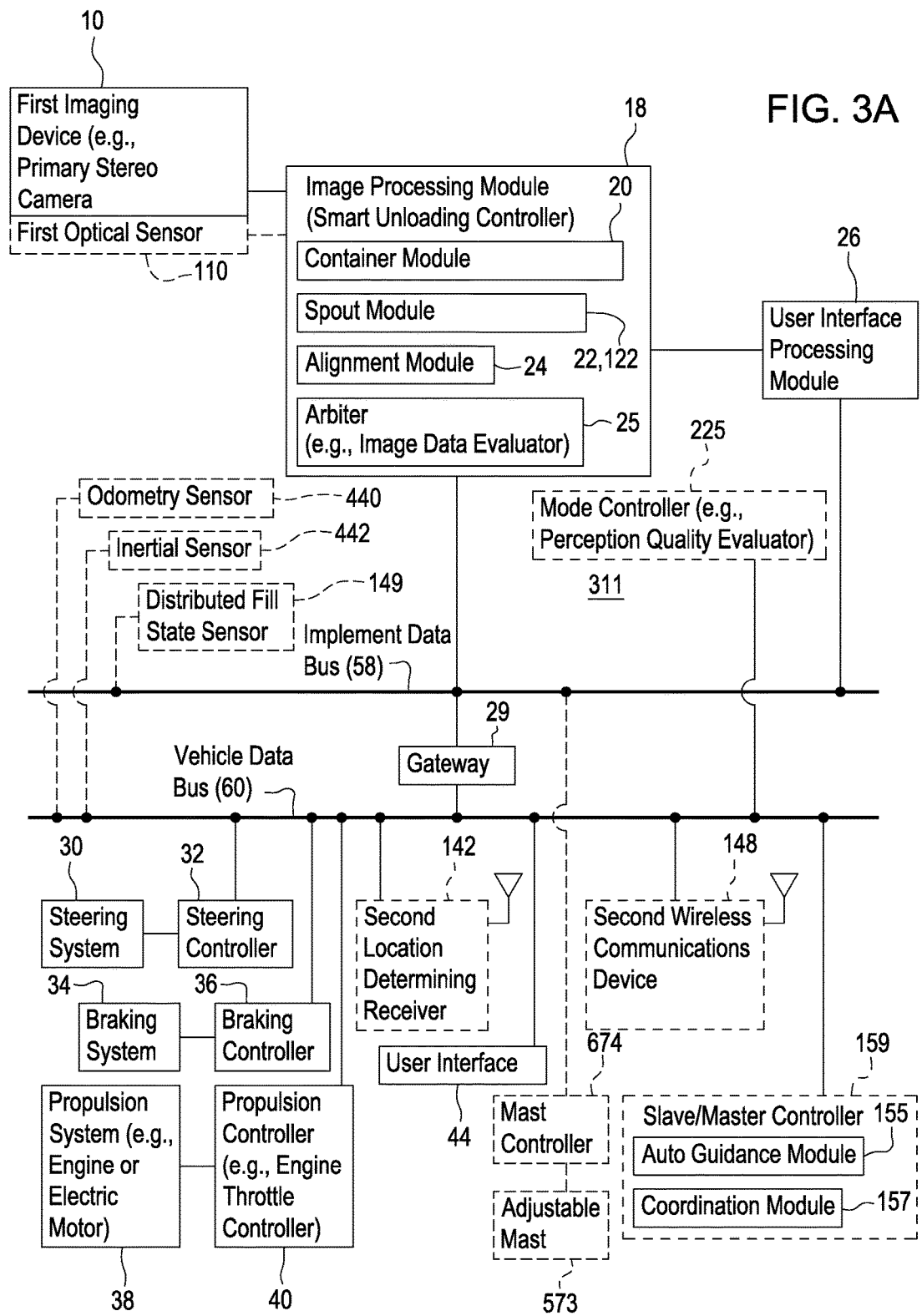
FIG. 3A is a block diagram of an embodiment of a machine vision-augmented guidance system for a receiving vehicle for facilitating the unloading or transferring of agricultural material from a transferring vehicle to the receiving vehicle (e.g., grain cart and tractor).
Figure 3B:
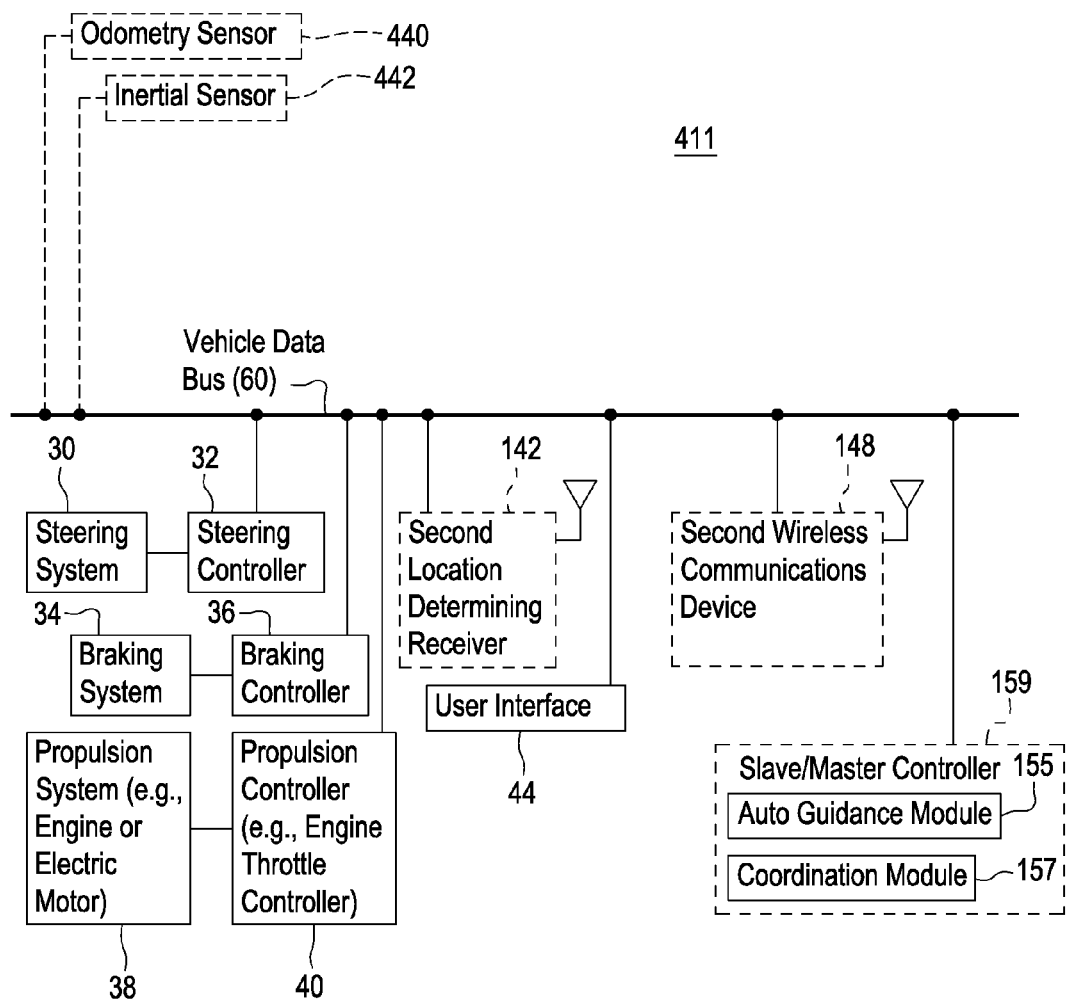
FIG. 3B is a block diagram of an embodiment of an electronic or guidance system for a receiving vehicle for cooperation with the machine vision-augmented guidance system of FIG. 1 or FIG. 2.

In another configuration, the alignment module 24 or image processing module 18 may regularly or periodically move, adjust or rotate the target zone or central zone during loading of the container 85 of the receiving vehicle to promote even filling, a uniform height, or uniform distribution of the agricultural material in the entire container 85, where the image processing module 18 identifies the fill state of the agricultural material in the image data from the material profile module 27 or receives fill state data from distributed fill state sensors 149 in FIG. 3A or FIG. 3B (associated with the container 85) via the wireless communication devices (48, 148).

The imaging module 18 may comprise material profile module 27 or a fill level sensor for detecting a one-dimensional, two-dimensional or three-dimensional representation of the fill level or volumetric distribution of the agricultural material in the container 85 or storage portion 93. For example, FIG. 5C shows various illustrative two-dimensional representations of the fill state of the container 85, or the distribution of agricultural material in the container 85, where FIG. 5C will be described later in detail.

In one configuration, the coordination module 57 or the steering controller 32 adjusts the relative position (of offset, such as the offset components illustrated in FIG. 4A) of the transferring vehicle to the receiving vehicle. For example, the steering controller 32 associated with the steering system 30 of the transferring vehicle can steer the transferring vehicle in accordance with a cooperative alignment (e.g., that is suitable for efficiently transferring material from the transferring vehicle to the receiving vehicle, while both are in generally forward motion) based on location data and motion data from first location-determining receiver 42 and the second location-determining receiver 142. With or without such location and motion data from the one or more location-determining receivers (42, 142), the alignment module 24, the coordination module 57 and the auger rotation system 16 may control the relative position of the spout 89 or the spout end 87 to the container perimeter 81 to achieve an even fill to the desired fill level. For example, actuator 210 or the auger rotation system 16, alone or in combination with its vehicle controller 46, may adjust the spout angle (e.g., a first spout angle ($\alpha$) or rotation angle, a second spout angle ($\beta$) or tilt angle, or a compound angle ($\alpha$ and $\beta$)) that the spout 89 makes with respect to a reference axis or reference coordinate system associated with the transferring vehicle 91 or a generally vertical plane associated with the direction of travel of the transferring vehicle 91, where the spout 89 meets and rotates with respect to the vehicle.

The spout end 87 may be adjusted for unloading agricultural material by shifting its spout angle or spout position, within the container perimeter 81 and a tolerance clearance from the container perimeter 81 within the container 85. The spout end 87 may be adjusted by various techniques that may be applied alternately, or cumulatively. Under a first technique, the alignment module 24 adjusts the spout end 87 for unloading agricultural material by shifting its spout angle (e.g., a first spout angle ($\alpha$) or rotation angle, a second spout angle ($\beta$) or tilt angle, or both.) The rotation actuator (210 or 260), or the rotation actuator 260 and the tilt actuator 262 may adjust the rotation angle, the tilt angle, or both with respect to the transferring vehicle to place the spout 89 or spout end 87 in cooperative alignment based on the collected image data for a sampling period.

Under a second technique, the alignment module 24 requests (or commands) the coordination module 57 to adjust the fore/aft offset adjustment ($\Phi$ or $\varphi$), the lateral adjustment ($\Delta$), or both, where the coordination module 57 manages or choreographs the relative fore/aft offset and lateral offset between the transferring vehicle and receiving vehicle by moving the transferring vehicle, the receiving vehicle, or both. Under a third technique, the alignment module 24 primarily adjusts the spout end 87 for unloading agricultural material by shifting its spout angle and the coordination module 57 secondarily and regularly (e.g., periodically) moves the fore/aft offset and the lateral offset by fore/aft offset adjustment ($\Phi$ or $\varphi$), the lateral adjustment ($\Delta$), respectively, to achieve a uniform fill state or level loading of the container with the agricultural material. Accordingly, the spout end 87 may be adjusted regularly (e.g., in a matrix of one or more rows or columns of preset offset positions) for unloading agricultural material by shifting the spatial relationship between the transferring vehicle and the receiving vehicle by a fore and aft offset or a lateral offset to achieve a target alignment or desired even distribution of filling the container 85 or storage portion 93 with agricultural material, while using the spout angle adjustment for fine tuning of the distribution of the agricultural material within the container (e.g., from each position within the matrix).

In the image processing module 18, the arbiter 25 comprises an image data evaluator. For example, the arbiter 25 may comprise an evaluator, a judging module, Boolean logic circuitry, an electronic module, a software module, or software instructions for determining: (1) whether or not to use the first image data (e.g., from the first imaging device 10), the second image data, or both, and/or (2) whether or not to use the image processing module 18 (or its output data) for alignment of a relative position of the spout and the container perimeter (or alignment of the spatial offset between the vehicles). In one embodiment the arbiter determines whether or not to use the first image data, the second image data, and the output data of the image processing module 18 based on evaluation one or more of the following metrics, factors or criteria during one or more sampling periods: material variation of intensity of pixel data, material variation in ambient light conditions during, image rectification quality, disparity image quality, stereo correspondence data quality, reliability, extent or degree of identification of edges of one or more image objects (e.g., spout, spout end, container perimeter, storage portion) or image data quality, reliability of coordinate estimation (e.g., three dimensional coordinates) of one or more objects in the image. The arbiter 25 may communicate one or more quality indicators (e.g., third indicator message) to the mode controller 225 (e.g., via a data bus, a logical data path, a physical data path, or a virtual data path).

An optional mode controller 225 is coupled to the data bus (e.g., 60). The mode controller 225 is shown in dashed lines to indicate that it is optional. The mode controller 225 may comprise a perception quality evaluator, a judging module, Boolean logic circuitry, an electronic module, a software module, or software instructions for determining whether to operate the machine-vision-augmented guidance system (e.g., 11, 111, or 311) in: (1) an operator-directed manual mode in which one or more human operators steer the receiving vehicle, the transferring vehicle or both during transfer of agricultural material from the transferring vehicle to the steering vehicle; (2) an automated mode in which the receiving vehicle, the transferring vehicle or both are steered and aligned automatically during transfer of agricultural material from the transferring vehicle to the receiving vehicle; or (3) a semi-automated mode or partially automated mode in which one or more operators supervise and can override the automated steering and alignment of the transferring vehicle and the receiving vehicle. For example, the mode controller 225 may determine whether to use an automated control mode of the spout or an operator-directed manual control mode of the spout based on a first operational status of a first location-determining receiver 42 associated with the transferring vehicle, a second operational status of a second location-determining receiver 142 associated with the receiving vehicle, and a third operational status of the first imaging device 10 or an image processing module 18 (e.g., on the transferring vehicle or the receiving vehicle).

In one configuration, the automated control mode comprises an operational mode where an image processing module 18 processes the collected image data to facilitate the determination of the relative position of the spout 89 (e.g., the spout end 87) and the storage portion 93 (or its container perimeter or a central zone of the storage portion 93). Further, in the automated control mode, the image processing module 18 may generate command data to place the storage portion 93 (or its container perimeter or central zone) and the spout 89 (e.g., the spout end 87) such that the spout is aligned for transferring of agricultural material into the storage portion 93. The command data may comprise one or more of the following: steering command data for the receiving vehicle, steering command data for the transferring vehicle, or actuator command data for rotating or otherwise manipulating any actuators (e.g. for rotation, tilt or deflection) of the spout.

In one embodiment, the mode controller 225 comprises a perception quality evaluator that evaluates the functionality, diagnostics, performance, tests or quality of one or more location-determining receivers (42, 142), imaging devices (10, 12), range finders, odometrical sensor (440), deadreckoning sensors, inertial sensors (442), navigation sensors, or other perception sensors. In one illustrative example, the first operational status is acceptable if the first locationdetermining receiver 42 provides reliable position data that meets or exceeds a dilution of precision threshold or another navigation satellite reliability measure during a sampling period; the second operational status is acceptable if the second location-determining receiver 142 provides reliable position data that meets or exceeds a dilution of precision threshold or another navigation satellite reliability measure (e.g., total equivalent user range error) during a sampling period. Further, the third operational status is acceptable if the first imaging device 10 provides reliable image data in which the container module 20 or spout module 22 (e.g., or the respective edge detection modules therein) are capable of any of the following: (1) reliably identifying or resolving one or more edges of spout 89, the spout end 87, the container perimeter 81 or a portion thereof, or the storage portion 93 in the collected image data during a sampling time period, (2) reliably identifying on a time percentage basis (e.g., at least 99.99% of the time) one or more reference objects (e.g., a reference pattern or reference image on the spout or receiving vehicle) or objects in the image data, (3) reliably determining (e.g., via stereo correspondence or disparity processing) coordinates (e.g., in three dimensions) of a material portion (e.g., a group or constellation of reference points) on one or more of the following: the spout 89, the spout end 87, the storage portion, container perimeter or a portion thereof during a sampling period, or (4) reliably identifying (e.g., via an edge detector 105 or other processing) one or more edges of the spout end 87 and one or more edges of the container perimeter 81 of the storage portion.

Figure 2:
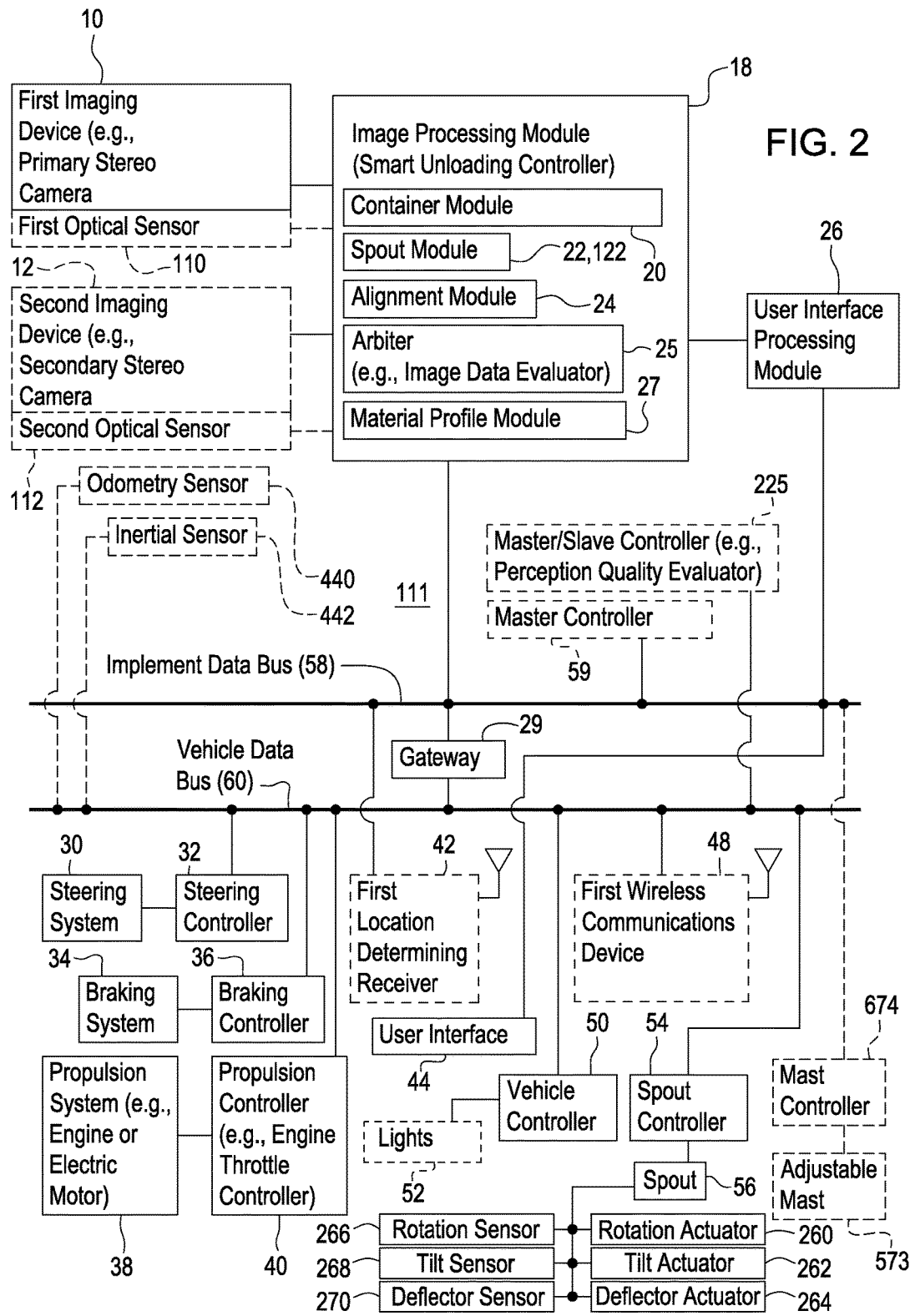
FIG. 2 is a block diagram of another embodiment of a machine vision-augmented guidance for a transferring vehicle for facilitating the unloading or transferring of agricultural material from the transferring vehicle (e.g., a self-propelled forage harvester).

In on configuration in FIG. 1 and FIG. 2, the systems (11 or 111) may use a detected rotation angle (of the spout 89) detected by the rotation sensor 116 or 266, respectively, along with a known length of the spout 89 to estimate the spout position or the coordinates (e.g., in three dimensions) of the spout end 87. However, where the rotation angle or the rotation sensor (116 or 266) is not present, operating, or in communication with the image processing module 18, the spout module (22 or 122) may use image processing for any of the following: (1) to estimate a spout angle or rotation angle of the spout with respect to the transferring vehicle, (2) to estimate a spout position (e.g., three dimensional coordinates) of the spout 89, and (3) to estimate a spout position (e.g., three dimensional coordinates) of the spout end 87.

Dilution of precision provides a figure of merit of the performance of a location-determining receiver (e.g., 42, 142) that uses a satellite navigation system, such as the Global Positioning System (GPS) or Global Navigation Satellite System (GLONASS). Dilution of precision captures the time-varying impact of spatial geometry and separation between a location-determining receiver (42, 142) and satellites signals that are received by the location-determining receiver, as opposed to clock errors, ionospheric errors, multipath errors, and other errors. The precision in pseudorange estimate to each satellite can affect the accuracy of the determination of a three dimensional position estimate and time estimate of the location-determining receiver (42, 142). If receivable navigation satellites are spatially too close together in orbit for a given location-determining receiver a particular time, accuracy of the position estimate may be compromised and the dilution of precision value can be higher than normal or acceptable.

In one embodiment, the first location-determining receiver 42 provides a first indicator message that indicates that the first location-determining receiver 42 meets or exceeds a precision dilution threshold; the second locationdetermining receiver 142 provides a second indicator message that indicates that the second location-determining receiving 142 exceeds a precision dilution threshold; and the image processing module 18 provides a third indicator message that indicates that the image processing module 18 is capable of reliably identifying one or more edges of the spout end 87 and one or more edges of the container perimeter 81 of the storage portion 93 during a sampling period.

If the mode controller 225 is separate from the image processing module 18, any failure or disruption of the functioning of the image processing module 18, its hardware or its software is generally separate and distinct from any failure of disruption of the functioning of the mode controller 225, which adds a measure of redundancy and reliability to the system (e.g., 11 or 111). Although the mode controller 225 is shown separate and outside of the image processing module 18, in an alternate embodiment the mode controller 225 may be incorporated into the image processing module 18, which could potentially reduce the cost of the system (e.g., 11 or 111).

A master/slave controller 59 is coupled to the data bus (e.g., 60). In one embodiment, the master/slave controller 59 comprises an auto-guidance module 55 and coordination module 57. The auto-guidance module 55 or master/slave controller 59 can control the transferring vehicle in accordance with location data from the first location-determining receiver 42 and a path plan or desired vehicle path (e.g., stored in data storage 19). The auto-guidance module 55 or master/slave controller 59 sends command data to the steering controller 32, the braking controller 36 and the propulsion controller 40 to control the path of the transferring vehicle to track automatically a path plan or to track manually steered course of an operator via the user interface 44 or steering system 30.

The coordination module 57 may facilitate alignment of movement (e.g., choreography) between the transferring vehicle (e.g., 91 in FIG. 4A) and the receiving vehicle (e.g., 79 in FIG. 4A) during unloading or transferring of agricultural material between the vehicles. For example, the coordination module 57 may facilitate maintenance of a uniform lateral offset (Δ in FIG. 4A) and a uniform fore/aft offset (Φ or φ in FIG. 4A) between the vehicles during unloading of the agricultural material, subject to any adjustments for attainment of a uniform distribution of material in the container 85. Collectively, the uniform lateral offset and uniform for/aft offset may be referred to as a uniform spatial offset. In certain embodiments, maintenance of the lateral offset and fore/aft offset, or coordination of any shift in the lateral offset and fore/aft offset (e.g., pursuant to a two-dimensional matrix of pre-established positions (x, y points) for uniform loading of a respective particular container or storage portion similar to that illustrated in FIG. 5D), is a necessary or desired precondition to implementing spout angle adjustment of the spout 89 or spout end 87 by the alignment module 24.

In one embodiment in a leader mode, the transferring vehicle is steered by the auto-guidance module 55 or the steering controller 32 in accordance with path plan, or by a human operator. The master/slave controller 59 or coordination module 57 controls the receiving vehicle in a follower mode via the slave/master controller 159, where the transferring vehicle operates in the leader mode. If the transferring vehicle operates in an automated mode or auto-steering mode, the master/slave controller 59 provides command data locally to the steering controller 32, braking controller 36, and propulsion engine controller 40 of the transferring vehicle. Such command data can be normalized (or scaled), time stamped, and communicated to the receiving vehicle via wireless communication devices (48, 148) for processing by the slave/master controller 159. Alternatively, the velocity, acceleration, and heading data of the transferring vehicle is communicated to the receiving vehicle via the wireless communications devices (48, 148) to enable to receiving vehicle to follow the path of the transferring vehicle (e.g., with a minimal time delay). In an automated mode and in a leader-follower mode, the receiving vehicle, the transferring vehicle or both are steered and aligned automatically during transfer of agricultural material from the transferring vehicle to the receiving vehicle.

The image processing module 18 provides image data to a user interface processing module 26 that provides, directly or indirectly, status message data and performance message data to a user interface 44. As illustrated in FIG. 1, the image processing module 18 communicates with a vehicle data bus 60 (e.g., Controller Area Network (CAN) data bus).

In one embodiment, a location-determining receiver 42, a first wireless communications device 48, a vehicle controller 46, a steering controller 32, a braking controller 36, and a propulsion controller 40 are capable of communicating over the vehicle data bus 60. In turn, the steering controller 32 is coupled to a steering system 30 of the transferring vehicle; the braking controller 36 is coupled to the braking system 34 of the transferring vehicle; and the propulsion controller 40 is coupled to the propulsion system 38 of the transferring vehicle.

In FIG. 1, the steering system 30 may comprise an electrically-driven steering system, an electro-hydraulic steering system, a gear driven steering system, a rack and pinion gear steering system, or another steering system that changes the heading of the vehicle or one or more wheels of the vehicle. The braking system 34 may comprise a regenerative braking system, an electro-hydraulic braking system, a mechanical breaking system, or another braking system capable of stopping the vehicle by hydraulic, mechanical, friction or electrical forces. The propulsion system 38 may comprise one or more of the following: (1) the combination of an electric motor and an electric controller, (2) internal combustion engine that is controlled by an electronic fuel injection system or another fuel metering device that can be controlled by electrical signals, or (3) a hybrid vehicle in which an internal combustion engine drives a electrical generator, which is coupled to one or more electric drive motors.

The system 11 facilitates the transfer of agricultural material from the transferring vehicle (e.g., a harvesting vehicle) to a receiving vehicle. The system 11 comprises a receiving vehicle with a propelled portion for propelling the receiving vehicle and a storage portion 93 for storing agricultural material. A stereo imaging device, such as the first imaging device 10, faces towards the storage portion 93 of the receiving vehicle. As shown in FIG. 1, the first imaging device 10 and the optional second imaging device 12 are mounted on the transferring vehicle, consistent with FIG. 4A. However, in alternate embodiments, the first imaging device 10, the optional second imaging device 12, or both may be mounted on the receiving vehicle or the propulsion portion 75 of the receiving vehicle as shown in FIG. 5A, or arranged in other possible configurations.

One or more imaging devices (10, 12) are arranged to collect image data. A container module 20 identifies a container perimeter 81 of the storage portion 93 in the collected image data. The storage portion 93 has an opening inward from the container perimeter for receipt of the agricultural material. A spout module 22 is configured to identify a spout (e.g., 89 of FIG. 4A) of the harvesting vehicle in the collected image data. An alignment module 24 is adapted for determining the relative position of the spout 89 and the container perimeter (81 of FIG. 4A) and for generating command data to the transferring vehicle or the propelled portion 75 of the receiving vehicle 79 to steer the storage portion 93 in cooperative alignment such that the spout 89 is aligned within a central zone 83 of the container perimeter 81. A steering controller 32 is associated with a steering system 30 of the propelled portion for steering the receiving vehicle in accordance with the cooperative alignment.

In one embodiment, an optional mast controller 674, indicated by dashed lines, is coupled to the vehicle data bus 60, the implement data bus, or the image processing module 18 to control an optional adjustable mast 573 for mounting and adjustably positioning the first imaging device 10, the second imaging device 12, or both. The mast controller 674 is adapted to change the orientation (e.g., compound angular orientation) or height above ground of the first imaging device 10, the second imaging device 12 or both, where the orientation may be expressed as any of the following: a tilt angle, a pan angle, a down-tilt angle, a depression angle, or a rotation angle.

In one configuration, a user interface 44 is arranged for entering container reference data or dimensional parameters related to the receiving vehicle. For example, the container reference data or dimensional parameters comprise a distance between a trailer hitch or pivot point (which interconnects the propulsion unit 75 and the storage portion 93) and front wheel rotational axis of the storage portion 93 of the receiving vehicle 79.

In an alternate embodiment, in FIG. 1, the first imaging device 10 comprises a monocular imaging device and the second imaging device 12 comprises a monocular imaging device that provides first monocular image data and second monocular image data, respectively. The image processing module 18 or system (e.g., 11, 111 or 311) can create a stereo image from the first monocular image data (e.g., right image data) and the second monocular image data (e.g., left image data) with reference to the relative position and orientation of the first imaging device 10 and the second imaging device 12. The image processing module 18 determines: (1) at least two points on a common visual axis that bisects the lenses of both the first imaging device 10 and the second imaging device 12, and (2) a linear spatial separation between the first imaging device 10 and the second imaging device 12, where the first field of view 77 (in FIG. 4A) of the first imaging device 10 and the second field of view 177 of the second imaging device 12 overlap, at least partially, to capture the spout 89, the spout end 87 and the container perimeter 81 in the collected image data.

In an alternate embodiment, FIG. 1 further comprises an optional odometrical sensor 440 (e.g., odometer), and an optional inertial sensor 442, as illustrated by the dashed lines in FIG. 1. The odometer sensor 440 may comprise a magnetic rotation sensor, a gear driven sensor, or a contactless sensor for measuring the rotation of one or more wheels of the transferring vehicle to estimate a distance traveled by the transferring vehicle during a measurement time period, or a ground speed of the transferring vehicle. The odometrical sensor 440 may be coupled to the vehicle data bus 60 or an implement data bus. The inertial sensor 442 may comprise one or more accelerometers, gyroscopes or other inertial devices coupled to the vehicle data bus 60 or an implement data bus. The optional odometrical sensor 440 and the optional inertial sensor 442 may augment or supplement position data or motion data provided by the first location-determining receiver 42.

Figure 4A:
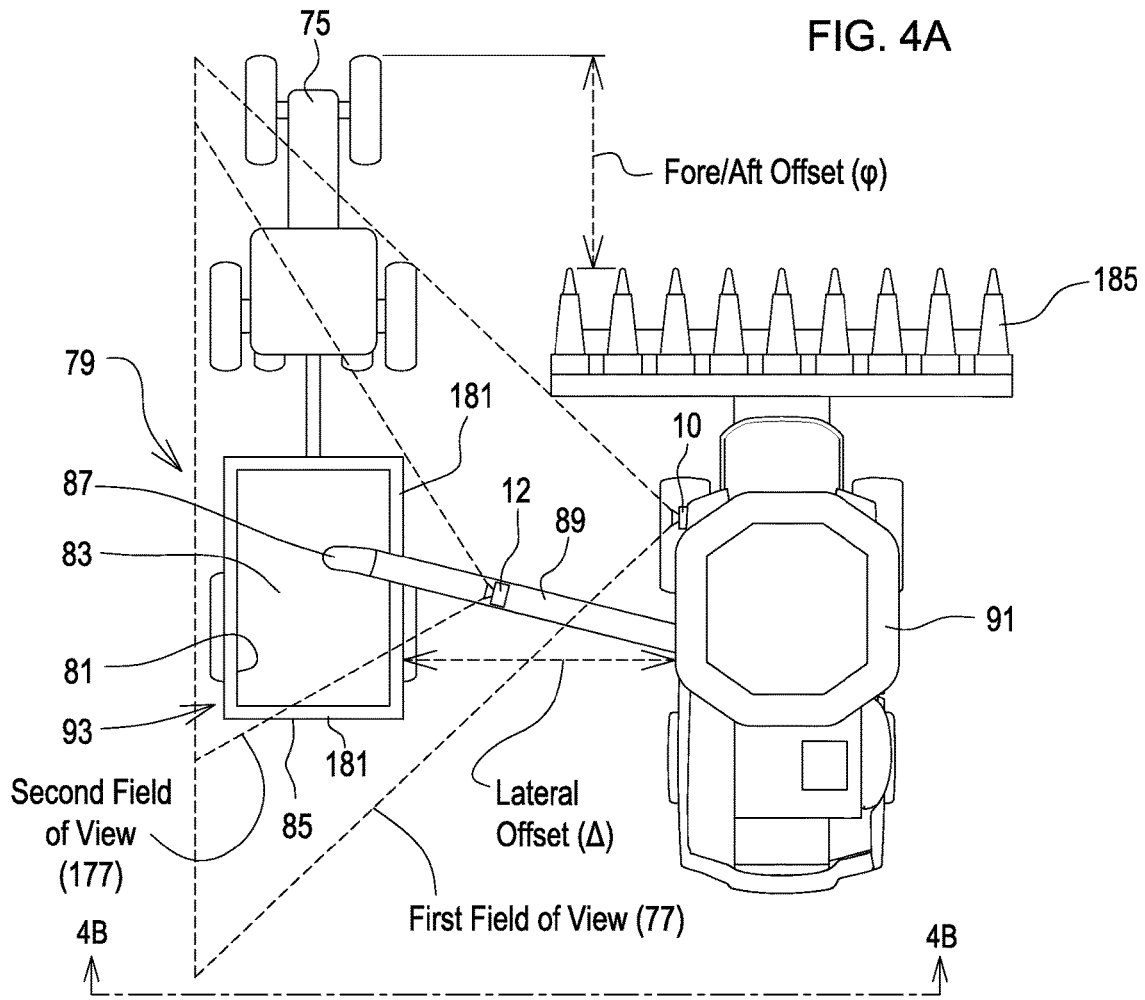
FIG. 4A illustrates a plan view of an imaging devices mounted on a transferring vehicle and facing toward a receiving vehicle.

The system 11 of FIG. 1 is well suited for use on a combine or harvester as the transferring vehicle. The system 11 of FIG. 1 may communicate and cooperate with a second system (311) on the receiving vehicle (e.g., as illustrated in FIG. 4A) to coordinate the relative alignment of the transferring vehicle and the receiving vehicle during unloading or transferring of material from the transferring vehicle. Like reference numbers in FIG. 1 and FIG. 2 indicate like elements.

The vision-augmented guidance system 111 of FIG. 2 is similar to the system 11 of FIG. 1; except that the system 111 of FIG. 2 further comprises an implement data bus 58, a gateway 29, and vehicle controllers 50 coupled to the vehicle data bus 60 for the optional lights 14 and spout 56 (in FIG. 2). The vehicle controller 50 controls the lights 52; the spout controller 54 controls the spout 89 via one or more of the following: a rotation actuator 260, tilt actuator 262, or deflector actuator 264. A rotation actuator 260 may rotate the spout about a first axis that is generally perpendicular to the ground; a tilt actuator 262 may tilt or rotate the spout at an upward or downward angle along a second axis that may be generally parallel to the ground or substantially perpendicular to the first axis. The deflector actuator 264 may activate a deflector at or near a spout end 87 of the spout 89 to avoid overshooting or undershooting the container or storage area of the receiving vehicle with harvested material, for example. In one embodiment, each of the rotation actuator 260, the tilt actuator 262, and the deflector actuator 264 may comprise a servo-motor, electric motor, or an electro-hydraulic mechanism for moving or adjusting the orientation or spout angle of the spout (89 in FIG. 5A or 56 in FIG. 2), or its spout end 87.

In one configuration, the spout controller 54 controls the spout 89 based on operator input or image processing module 18 based on sensor data from one or more of the following sensors: a rotation sensor 266, a tilt sensor 268, and a deflector sensor 270. A rotation sensor 260 measures a first angle of rotation of the spout about a first axis that is generally perpendicular to the ground; a tilt sensor 268 measures a second angle of rotation, or a tilt angle, of the spout at an upward or downward angle along a second axis that may be generally parallel to the ground or substantially perpendicular to the first axis. The deflector sensor 264 may measure a deflector angle or a deflector active status or inactive status at or near a spout end 87 of the spout (89 or 56) to avoid overshooting the container or storage area of a the receiving vehicle with harvested material, for example. In one embodiment, each of the rotation sensor 266, and the tilt sensor 268 may comprise a magnetic field sensor, a Hall Effect sensor, a magnetostrictive sensor, a magnetoresistive sensor, a variable resistor, or another suitable sensor for measuring an angle between the spout 89 and the transferring vehicle, with respect to rotation along the first axis, the second axis, or otherwise. In one configuration, the deflector sensor 270 may comprise a contact sensor or contact switch to provide a status message or status signal indicative of whether the deflector is extended or retracted with respect to the spout end 87.

In one configuration, the implement data bus 58 may comprise a Controller Area Network (CAN) implement data bus. Similarly, the vehicle data bus 60 may comprise a controller area network (CAN) data bus. In an alternate embodiment, the implement data bus 58, the vehicle data bus 60, or both may comprise an ISO (International Organization for Standardization) data bus or ISOBUS, Ethernet or another data protocol or communications standard.

The gateway 29 supports secure or controlled communications between the implement data bus 58 and the vehicle data bus 60. The gateway 29 comprises a firewall (e.g., hardware or software), a communications router, or another security device that may restrict or prevent a network element or device on the implement data bus 58 from communicating (e.g., unauthorized communication) with the vehicle data bus 60 or a network element or device on the vehicle data bus 60, unless the network element or device on the implement data bus 58 follows a certain security protocol, handshake, password and key, or another security measure. Further, in one embodiment, the gateway 29 may encrypt communications to the vehicle data bus 60 and decrypt communications from the vehicle data bus 60 if a proper encryption key is entered, or if other security measures are satisfied. The gateway 29 may allow network devices on the implement data bus 58 that communicate via an open standard or third party hardware and software suppliers, whereas the network devices on the vehicle data bus 60 are solely provided by the manufacturer of the transferring vehicle (e.g., self-propelled forage harvester) or those authorized by the manufacturer.

In FIG. 2, a first location-determining receiver 42, a user interface 44, a user interface processing module 26, and the gateway 29 are coupled to the implement data bus 58, although in other embodiments such elements or network devices may be connected to the vehicle data bus 60. Vehicle controller 50 and spout controller 54 are coupled to the vehicle data bus 60. In turn, the vehicle controller 50 and spout controller 54 are coupled, directly or indirectly, to optional lights 52 on the transferring vehicle and the spout 89 of the transferring vehicle (e.g., self propelled forage harvester). Although the system of FIG. 2 is well suited for use or installation on a self-propelled forage harvester, the system of FIG. 2 may also be applied to combines, harvesters or other heavy equipment.

The system 11 of FIG. 1 and the system 111 of FIG. 2 apply to the transferring vehicle, whereas the system of FIG. 3A and FIG. 3B apply to the receiving vehicle. Like reference numbers in FIG. 1, FIG. 2, FIG. 3A, and FIG. 3B indicate like elements. As previously noted, the transferring vehicle may comprise a combine, harvester, self-propelled harvester, vehicle or heavy equipment that collects or harvests material for transfer to the receiving vehicle. In one embodiment, the receiving vehicle may comprise a propelled portion (e.g., 75 in FIG. 4A) and a storage portion (e.g., 93 in FIG. 4A) for storing the material transferred from the transferring vehicle. The receiving vehicle may comprise the combination of a tractor and a grain cart or wagon, where the tractor is an illustrative example of the propelled portion 75 and where the grain cart is an illustrative example of the storage portion 93. Here, the system 311 of FIG. 3A is presented as an image processing system 18 that is alternatively on the receiving vehicle, instead of the transferring vehicle as in FIG. 1 and FIG. 2. In contrast, FIG. 3B is configured to cooperate with the system (11 or 111) of FIG. 1 or FIG. 2 as will be described later in detail.

The system of FIG. 3A comprises the first imaging device 10, the image processing module 18, the user interface processing module 26, the gateway 29, a second location-determining receiver 142, a second wireless communications device 148, the slave/master controller 159 among other devices illustrated in FIG. 3. In one embodiment, the first imaging device 10 is mounted on the propelled portion 75 (e.g., tractor) of the receiving vehicle facing backwards towards the storage portion 93 (e.g., cart) or container 85 (e.g., as illustrated in FIG. 5A). The second wireless communications device 148 (of the receiving vehicle) is adapted for communicating data with the first communications device 48 (of the transferring vehicle) of FIG. 1 or FIG. 2, for example. The second location-determining receiver 142 provides position data, location data, altitude, velocity, or acceleration data.

In one embodiment, in FIG. 3A the image processing module 18 estimates the relative position of the transferring vehicle and the receiving vehicle, and the relative orientation of the spout end 87 (or spout position) to the storage portion 93 (or container position) to direct or control the steering system 30, braking system 34, and propulsion system 38 of the receiving vehicle via one or more controllers (32,36,40) to place the transferring vehicle and receiving vehicle in a target transferring position for transferring of material from the spout end 87 to the storage portion 93. For example, the target transferring position or cooperative alignment can refer to registration or alignment of the spout position and the container position (e.g., for one or more sampling time periods). Meanwhile, the transferring vehicle may be controlled (steering, velocity, and acceleration) by its own operator or the first location-determining receiver 42. For example, the system 311 or image processing system 18 identifies the spout end 87, or the boot or tip of the spout where the material exits the spout 89 and computes (through stereo correspondence, disparity or other image processing) the relative position of the spout end 87 to the storage portion 93, the container perimeter of the storage portion 93, a central zone of the storage portion 93.

In FIG. 3A, a steering controller 32 associated with a steering system 30 of the receiving vehicle can steer the propelled portion of the receiving vehicle in accordance with a cooperative alignment (e.g., suitable for efficient transferring of material from the transferring material to the receiving vehicle) based on location data and motion data from the first location-determining receiver 42 and the second location-determining receiver 142. With or without such location and motion data from one or more location-determining receivers (42, 142), the image processing module 18 can use image data to align the spout 89 or spout end 87 with the storage portion 93 or container perimeter 81 of the receiving vehicle by steering the propelled portion of the receiving vehicle to maintain the cooperative alignment for unloading or transferring material between the vehicles.

FIG. 3B provides a configuration in which the transferring vehicle and receiving vehicle operate in a leader-follower configuration with transferring vehicle in the lead role and the receiving vehicle in the following role, such that the receiving vehicle tracks or follows the heading and velocity (and optionally the acceleration) of the lead vehicle with a target spatial offset. In FIG. 3B, the image processing module 18 is only active on the transferring vehicle and is inactive or not present on the receiving vehicle. On the transferring vehicle, the imaging processing module 18 and first location-determining receiver 42 provide image guidance data (if available or if reliable) and first motion data (e.g., location, heading, velocity and acceleration), respectively, that are used by both the transferring vehicle and the receiving vehicle for guidance.

In one configuration, the image guidance data, the first motion data, or both is transmitted by the first wireless communications device 48 on the transferring vehicle to the second wireless communications device 148 on the receiving vehicle. On the receiving vehicle, the slave/master controller 159 receives the first motion data (and first location data) from the first location-determining receiver 42 on the transferring vehicle and second motion data (and second location data) from the second location-determining receiver 142 on the receiving vehicle. The slave/master controller 159 generates an error or control data for controlling the steering system 30, braking system 34, and propulsion system 38 of the receiving vehicle, where the error or control data is based on the difference between the first motion data and the second motion data (and the first location data and second location data).

In another configuration, the master/slave controller 59 on the transferring vehicle may send control signals or control data messages to the slave/master controller 159 on the receiving vehicle to control the steering system 30, braking system 34, or propulsion system 38 of the receiving vehicle to optimize the relative position of the spout end 87 to the storage portion 93 of the container, the target spatial separation between the vehicles, or to avoid an imminent collision between the vehicles. On the receiving vehicle, the slave/master controller 159 can operate in a slave mode or follower mode under the control of the master/slave controller 59. The auto-guidance module 155 and the coordination module 157 within the slave/master controller 159 provide guidance of the receiving vehicle, consistent with location data and a path plan, or with other guidance data or command data from the master/slave controller 59 to the transferring vehicle.

The second wireless communications device 148 is coupled to the vehicle data bus 60. In FIG. 3A or FIG. 3B, the system (311 or 411) for a receiving vehicle can be used in conjunction with the system (11 or 111) of the transferring vehicle of FIG. 1 or FIG. 2. The wireless devices (48, 148) may exchange or communicate position data, relative position data, command data, or control data for controlling, adjusting or coordinating the position and orientation of the vehicles; more particularly, the position and the orientation of the spout 89 or spout end 87 over the opening 83 of the container 85. The communicated data between the wireless communications devices (48, 148) may comprise any of the following data: (1) position data or location data from either location-determining receiver (42 or 142), (2) command or guidance data from an image processing module 18 on the transferring vehicle or receiving vehicle, (3) command or guidance data from the master/slave controller 59 or coordination module 47, (4) command or guidance data from the slave/master controller 159 or coordination module 157 or (5) alignment data (e.g., relative position of the imaging devices, relative position of reference points on the vehicles, and relative alignment between the spout and container perimeter) from the alignment module 24. For example, the imaging processing module 18 or alignment module 24 may use first location data of a first location-determining receiver 42 and second location data of a second location-determining receiver 142 to determine a relative position or spatial offset between the two vehicles (or a relative position) of the first imaging device 10 and the second imaging device 12 and to determine a relative alignment between the spout and the container perimeter.

The system 311 of FIG. 3A may support different configurations or combinations of electronic systems (e.g., pairs 11 and 311, 111 and 311, 11 and 411, and 111 and 411) at the transferring and receiving vehicles. In a first configuration, an imaging device 10 on the receiving vehicle may be used instead of, or with, one or more imaging devices (10, 12) on the transferring vehicle. In a second configuration, the system 311 of FIG. 3A may provide collected image processing data from the receiving vehicle to the transferring vehicle via the transmission of the collected image processing data from the second wireless communications device 148 to the first wireless communications device 48. Here, in a second configuration, the collected imaging processing data from the receiving vehicle may be referred to as supplementary data, complementary image data, or additional image data. The additional image data may provide additional perspective or viewpoints that can supplement the image data collected by the transferring vehicle. For example, the additional image data may provide more accurate or supplement image data where the image data collected by the transferring vehicle is affected by moisture (e.g., on its lens), dust, poor ambient lighting, glare or reflections that do not similarly impair or impact the additional image data.

The optional odometrical sensor 440 may be coupled to the vehicle data bus 60 or the implement data bus 58. The inertial sensor 442 may comprise one or more accelerometers, gyroscopes or other inertial devices coupled to the vehicle data bus 60 or the implement data bus 60.

The distributed fill state sensors 149 (e.g., in FIG. 3A and FIG. 3B) may comprise optical level sensors (not shown) distributed at different height levels within or around the container 85, piezoelectric mass sensors distributed to measure mass of the agricultural material in different volumes or on different floor areas (e.g., of a false vertically movable floor) of the container 85, or piezoresistive mass sensors distributed to measure mass of the agricultural material in different volumes or on different floor areas of the container 85, for example.

FIG. 4A illustrates a plan view of a transferring vehicle 91 and a receiving vehicle 79. As illustrated in FIG. 4A for explanatory purposes, the transferring vehicle 91 is shown as a combine with a harvesting head 185, whereas the receiving vehicle 79 is shown as a tractor and a grain cart. More generally, the receiving vehicle 79 comprises the combination of a propulsion unit 75 and a storage unit 93 (e.g., a towed storage unit).

FIG. 4A shows a first imaging device 10 on the transferring vehicle (e.g., combine) and an optional second imaging device 12 on a spout 89 of the transferring vehicle 91. The spout 89 may also be referred to as an unloading auger. The spout end 87 may be referred to as a boot. The first imaging device 10 has a first field of view 77, indicated by the dashed lines. The boundaries of the fields of view (77, 177) are merely shown for illustrative purposes and will vary in actual practice. The second imaging device 12 has a second field of view 177, indicated by the dashed lines. In FIG. 4A, the spout 89, or the spout end 87, is generally aligned over a central zone 83, central region or target area of the storage container 85 (of the receiving vehicle) for unloading material from the transferring vehicle to the receiving vehicle 79. The target area may be consistent with cooperative alignment where the spout position and the container position are registered or aligned. Similarly, the transferring vehicle 91 and the receiving vehicle 79 are aligned in position as shown, regardless of whether the vehicles move together in a forward motion (e.g., with coordinated or tracked vehicle headings) during harvesting, as is typical, or are stationary. During unloading, the master/slave controller 59 and slave/master controller 159 facilitate maintenance of a generally uniform spatial offset (e.g., a generally static offset that varies only within a target tolerance) between the vehicles (91, 79), subject to any incremental adjustment of the offset for uniform filling of the container 85. The master/slave controller 59 and slave/master controller 159 support maintenance of a uniform fore/aft offset (Φ or φ) and a lateral offset (Δ).

In one embodiment the illustration in FIG. 4A, the second imaging device 12 may be mounted on the spout 89. The transferring vehicle 91 may be equipped with a spout angle sensor or rotation sensor 116 (e.g., rotary position sensor) to measure the rotation angle of the spout.

In an alternate embodiment for a spout-mounted imaging device (e.g., second imaging device 12 on the spout as shown in FIG. 4A), the rotation angle of the spout 89 may be used to facilitate fusion of image data from the first imaging device 10 and the second imaging device 12, or to construct stereo image data where the first imaging device 10 and the second imaging device 12 individually provide monocular image data for the same scene or object.

In any arrangement of imaging devices (10, 12) disclosed herein where the fields of view (77, 177) overlap, data fusion of image data from a first imaging device 10 and a second imaging device 12 enables the image processing module 18 to create a virtual profile of the material distribution level inside the storage portion 85, even when the entire surface of the agricultural material is not visible to one of the two imaging devices (10, 12). Even if the second imaging device 12 is not mounted on the spout 89 in certain configurations, the spout angle sensor 116 may facilitate using the spout end 87 as a reference point in any collected image data (e.g., for fusion, virtual stitching or alignment of image data from different imaging devices.) The virtual profile of the entire surface of the agricultural material in the storage portion 93 enables the system (11, 111, 311) or imaging module 18 to intelligently execute a fill strategy for the storage portion 93 of the receiving vehicle.

Figure 4B:
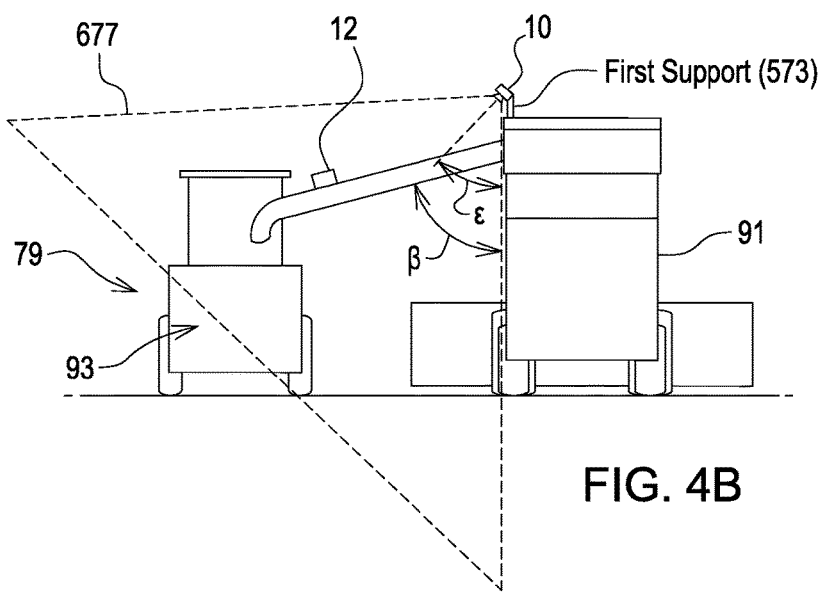
FIG. 4B illustrates a view in a horizontal plane as viewed along reference line 4B-4B in FIG. 4A.

In FIG. 4B, the first imaging device 10 and the second imaging device 12 are mounted on the transferring vehicle 91, where the first imaging device 10 is mounted on a first support 573 or adjustable mast (e.g., monopole with tilt or pan adjustment) to provide a first downward field of view 677 or a down-tilted field of view. As shown in FIG. 4B, the down-tilt angle ($\Sigma$) is measured with respect to a vertical axis. A tilt sensor on or in the imaging device 10, or associated with the mast-imaging device mounting hardware, may measure the down-tilt angle or the declination angle for reporting to the mast controller 674. For example, the tilt sensor may comprise one or more accelerometers, such as those that are commercially available for portable consumer electronic devices.

If the first imaging device 10 is elevated or mounted on the transferring vehicle 91 sufficiently high with respect to the storage portion 93, the first imaging device 10 will have visibility or downward field of view 677 into the storage portion 93 or container 85 sufficient to observe and profile the surface (or height (z) versus respective x, y coordinates in the container) of the agricultural material (e.g., grain) as the agricultural material fills the storage portion 85. The first imaging device 10 may be mounted on the roof of the transferring vehicle 91 facing or looking directly away from the side of the transferring vehicle with the spout 89 for unloading agricultural material.

If the first imaging device 10 is further from the storage portion 93 or container 85 than the second imaging device 12 during unloading of the agricultural material, the first imaging device 10 can have suitable view of the storage portion 93 (e.g., grain cart) to facilitate easier tracking of the relative position of the storage portion 93 to the transferring vehicle 91.

In one illustrative configuration, consistent with the downward field of view (677) the optical axes, perpendicular to respective lens, of the first imaging device 10, the second imaging device 12, or both are tilted downward from generally horizontal plane at a down-tilted angle (c) (e.g., approximately 60 to 85 degrees downward from the vertical axis as shown in FIG. 4B or approximately 10 to 25 degrees downward from a horizontal axis or horizontal plane). If a field of view or optical axis of the imaging device (10, 12) is tilted downward from a generally horizontal plane, there are several advantages.

First, less of the sky is visible in the field of view of the imaging device (10, 12) such the collected image data tends to have a more uniform image intensity profile. The tilted configuration of the optical axis or axes (which are perpendicular to the lenses of the imaging devices (10, 12) is well suited for mitigating the potential dynamic range issues caused by bright sunlight or intermediate cloud cover, for instance. In one embodiment, the imaging device (e.g., 10) is mounted with a down-tilt angle to avoid washout of, corruption of, or interference with collected image data during a transient exposure time period to sunlight, a reflection or a light source that exceeds a threshold brightness level for a material portion of the pixels in the collected image data.

Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device (10, 12).

FIG. 5A illustrates a plan view of a transferring vehicle and a receiving vehicle. Like reference numbers indicate like elements in FIG. 5A and FIG. 4. FIG. 5A shows a first imaging device 10 on the rear of the propulsion unit 75 (e.g., tractor) or the receiving vehicle 79. The first imaging device 10 has a first field of view 277 indicated by the dashed lines. In FIG. 5A, the spout 89 or spout end 87 is generally aligned over a central zone 83, central region or target area of the storage unit 93 or container 85 for unloading material from the transferring vehicle 91 to the receiving vehicle 79. Similarly, the transferring vehicle 91 and the receiving vehicle 79 are aligned in position as shown, and even as the vehicles (79, 91) move with coordinated headings or generally parallel headings and with no or minimal relative velocity with respect to each other.

In an alternative embodiment of FIG. 5A, an optional second imaging device 12 may be mounted on the vehicle with a second field of view, which may be slightly offset from, overlapped with, or aligned with the first field of view 277 to provide redundancy should the first imaging device 10 fail, malfunction, be unavailable, be unreliable, or provide poor quality image data. For example, the first imaging device 10 may not operate reliably where it is obscured by dust, fog, salt, or air-born contaminants, or where it is exposed to inadequate ambient light conditions or excessive glare from sunlight or reflected light. In FIG. 5A, the image processing module 18 can estimate the distance or range from the first imaging device 10, the second imaging device 12, or both to an object in the image, such as the spout 89, the spout end 87, the container perimeter 81, the level or profile of agricultural material in the container 85 (e.g., at various positions or coordinates within the container 85).

Figure 5B:
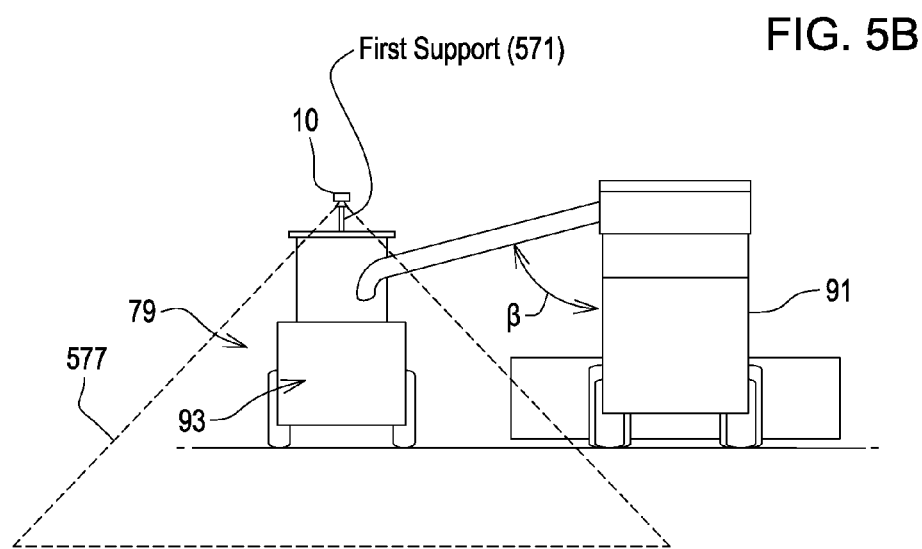
FIG. 5B illustrates a view in a horizontal plane as viewed along reference line 5B-5B in FIG. 5A.
Figure 5C:
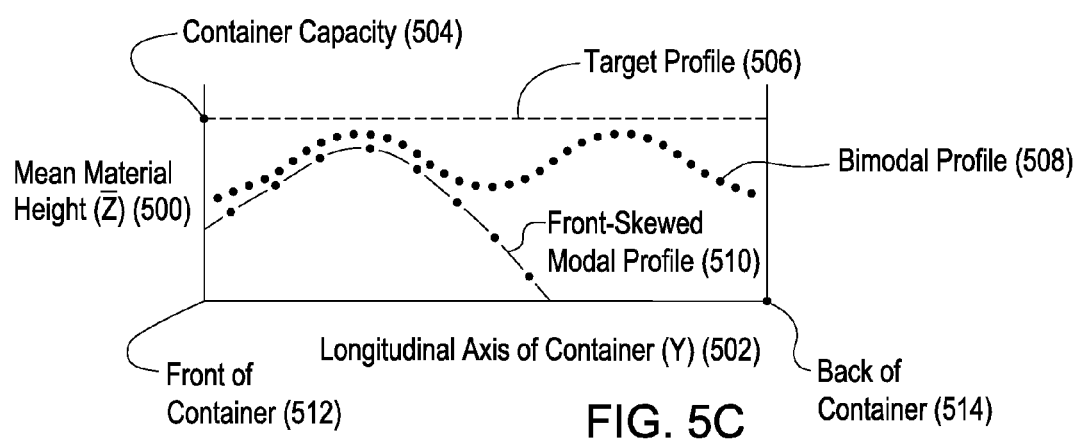
FIG. 5C illustrates a two-dimensional representation of various possible illustrative distributions of material in the interior of a container or storage portion, consistent with a cross-sectional view along reference line 5D-5D in FIG. 5B.

FIG. 5B illustrates a view in a horizontal plane as viewed along reference line 5B-5B in FIG. 5A. In one embodiment, the first imaging device 10 is mounted on the receiving vehicle 79 on a first support 571 (e.g., monopole with tilt or pan adjustment) to provide a first downward field of view 577 or a first down-tilted field of view.

In an alternate embodiment, the first support 571 comprises an adjustable mast or telescopic mast that is controlled by a mast controller (674) to remotely adjust the height, tilt angle, down-tilt angle, declination angle, rotation angle, or pan angle to provide reliable image data for processing by the image processing module 18. The down-tilt angle or declination angle may be measured with respect to a horizontal axis or horizontal plane that is perpendicular to a vertical axis. At or near a top or top segment of the mast, a movable or adjustable shelf, a movable or adjustable mounting bracket or other movable mounting arrangement secures the imaging device 10 to the first support or mast.

If the first imaging device 10 is elevated or mounted on the receiving vehicle 79 sufficiently high with respect to the storage portion 93, the first imaging device 10 will have visibility or first downward field of view 577 into the storage portion 93 or container 85 sufficient to observe and profile the surface (or height (z) versus respective x, y coordinates in the container) of the agricultural material (e.g., grain) as the agricultural material fills the storage portion 85. The first imaging device 10 may be mounted on the roof or cab of the receiving vehicle 79 (or its propulsion unit 75) facing or looking directly away from the side of the transferring vehicle with the spout 89 for unloading agricultural material.

In one illustrative configuration, consistent with the downward field of view 577 the optical axes, perpendicular to respective lens, of the first imaging device 10 is tilted downward from generally horizontal plane at a down-tilted angle (e.g., approximately 10 to 25 degrees downward from the horizontal plane or horizontal axis). If a field of view or optical axis of the imaging device 10 is tilted downward from a generally horizontal plane, there are several advantages. First, less of the sky is visible in the field of view of the imaging device 10 such the collected image data tends to have a more uniform image intensity profile. The tilted configuration of the optical axis (which are perpendicular to the lenses of the imaging devices 10 is well suited for mitigating the potential dynamic range issues caused by bright sunlight or intermediate cloud cover, for instance. Second, the bottom part of the storage portion 93 becomes more visible in the image data to enable the recording of the image data related to one or more wheels of the storage portion 93. The wheel is a feature on the storage portion 93 that can be robustly tracked by image processing techniques. Third, tilting the stereo camera down may mitigate the accumulation of dust and other debris on the lens or external window of the imaging device 10.

FIG. 5C illustrates a two-dimensional representation of various possible illustrative distributions of material in the container 85, consistent with a view along reference line 5C-5C in FIG. 5A. In one configuration, the y axis is coincident with the longitudinal axis or direction of travel of the container, the z axis is coincident with the height of material in the container, and the x axis is perpendicular to the direction of travel of the container, where the x, y and z axes are generally mutually orthogonal to each other.

In the chart of FIG. 5C, the vertical axis is the mean height ($\bar{z}$) 500 of the material in the container 85; the horizontal axis represents the longitudinal axis (y) 502 of the container 85. The maximum capacity 505 or container capacity is indicated by the dashed line on the vertical axis. The front 512 of the container 85 is located at the origin, whereas the back 514 of the container 85 is located on the vertical axis.

FIG. 5C shows three illustrative distributions of material within the container 85. The first distribution is a bimodal profile 508 in which there are two main peaks in the distribution of material in the container 85. The bimodal profile 508 is shown as a dotted line. The bimodal profile 508 can occur where the spout angle adjustment is governed by an electro-hydraulic system with non-proportional valves.

The second distribution is the front-skewed modal profile 510 in which there is single peak of material toward the front of the container 85. The front-skewed modal profile 510 is shown as alternating long and short dashes. The second distribution may occur where the volume or length (y) of the container 85 is greater than a minimum threshold and where the relative alignment between the spout end 87 and the container 85 is generally stationary during a substantial portion of unloading of the material.

The third distribution is the target profile 508 which may be achieved by following a suitable fill strategy as disclosed in this document. For example, during unloading, the spout angle may be adjusted to promote uniform distribution of the agricultural material in the container 85. Further, the lateral offset ($\Delta$) or fore/aft offset ($\Phi$ or $\varphi$) between the vehicles (79, 91) may be adjusted in accordance with a matrix (e.g., x, y coordinate matrix of equidistant point locations of the transferring vehicle relative to a constantly spaced position point of the receiving vehicle) of relative unloading positions, particularly for longer or wider containers that cannot be uniformly filled from a single, relative unloading point between the vehicles (79, 91).

Figure 5D:
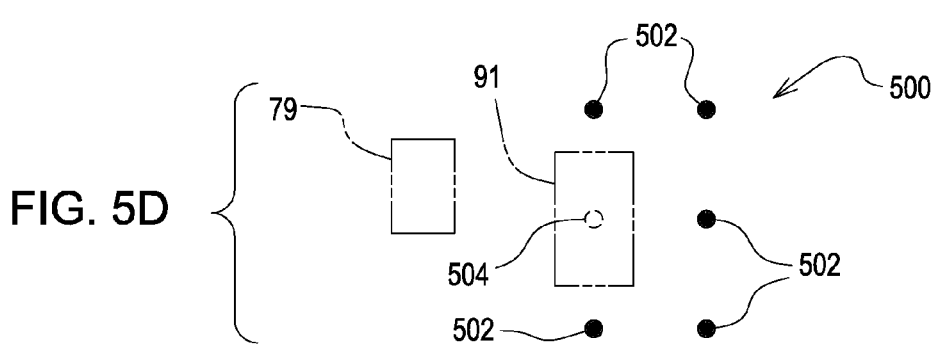
FIG. 5D is a plan view of a transferring vehicle and a receiving vehicle, where the transferring vehicle is aligned within a matrix of possible offset positions.

FIG. 5D is a plan view of a transferring vehicle 91 and a receiving vehicle 79, where the transferring vehicle 91 is aligned within a matrix 500 of possible offset positions (502, 504) between the transferring and receiving vehicle 79. Each offset position (502, 504) may be defined in terms of a combination of a unique lateral offset ($\Delta$) and a unique fore/aft offset ($\Phi$ or $\varphi$) between the vehicles (79, 91). As shown, the matrix 500 is a two-dimensional, 2×3 (2 columns by 3 rows) matrix of possible offset positions (502, 504). Although six possible matrix positions (502, 504) are shown, in alternate embodiments the matrix 500 may consistent of any number of possible offset positions greater than or equal to two. Here, the transferring vehicle 91 occupies a current offset position 504 in the first column at the second row of the matrix 500, whereas the other possible offset positions 502 are not occupied by the transferring vehicle 91. As directed by any of the systems (11, 111, 311), the imaging processing module 18, or the master/slave controller 59 of the transferring vehicle 91 or the receiving vehicle 79 can shift to any unoccupied or other possible offset positions 502 within the matrix 500 to promote or facilitate an even distribution of agricultural material within the container 85 or storage portion of the receiving vehicle 79. The spatial offset between the transferring vehicle 91 and the receiving vehicle 79 may be adjusted in accordance with the matrix 500 or another matrix of preset positions of spatial offset to promote even distribution of agricultural material in the storage portion of the receiving vehicle 79, where any matrix is associated with a unique, relative lateral offset ($\Delta$) and fore/aft offset ($\Phi$ or $\varphi$) between the vehicles (79, 91).

In one embodiment of FIG. 5D, both the transferring vehicle 91 and the receiving vehicle 79 may be moving forward at approximately the same velocity and heading (e.g., within a tolerance or error of the control systems during harvesting), where the relative position of the receiving vehicle 79 is generally fixed or constant with respect to each position (502, 504) in the matrix 500 that the transferring vehicle 91 can occupy.

In an alternate embodiment, the receiving vehicle 79 may be shown as occupying a two dimensional matrix (e.g., 3×3 matrix, with three columns and three rows) of possible offset positions, while the position of the transferring vehicle 91 is generally fixed or constant with respect to each position of matrix that the receiving vehicle 79 could occupy. As directed by any of the systems (11, 111, 311) in the alternate embodiment, the imaging processing module 18, or the master/slave/master controller 159 of the receiving vehicle 79 can shift to any unoccupied or other possible offset positions within the matrix to promote or facilitate an even distribution of agricultural material within the container 85 or storage portion of the receiving vehicle 79.

In FIG. 6A through 7D, inclusive, each of the blocks or modules may represent software modules, electronic modules, or both. Software modules may contain software instructions, subroutines, object-oriented code, or other software content. The arrows that interconnect the blocks or modules of FIG. 6A through FIG. 7D, inclusive, show the flow of data or information between the blocks. The arrows may represent physical communication paths or virtual communication paths, or both. Physical communication paths mean transmission lines or one or more data buses for transmitting, receiving or communicating data. Virtual communication paths mean communication of data, software or data messages between modules.

Figure 6A:
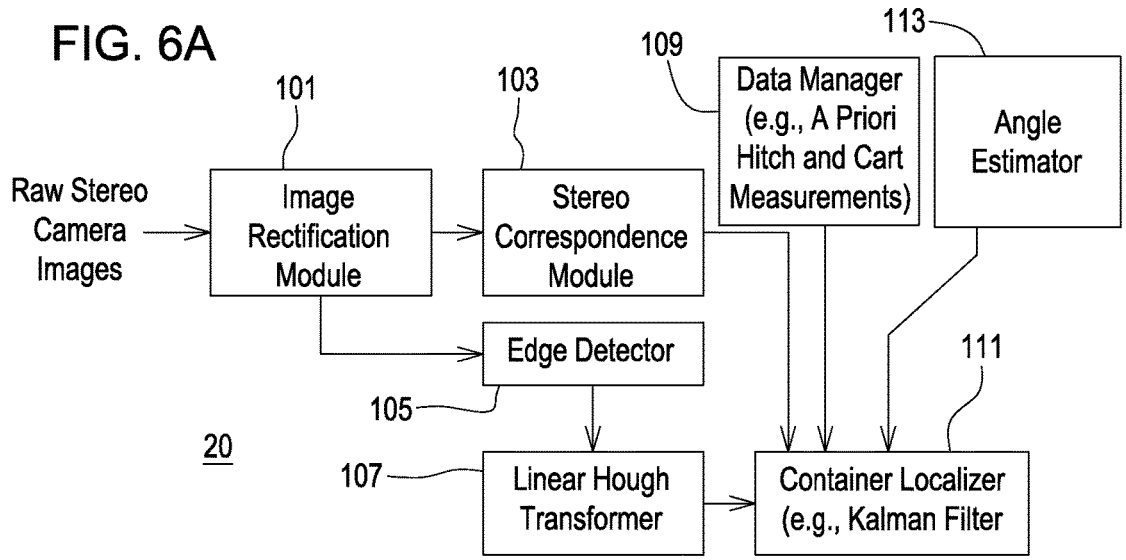
FIG. 6A illustrates a block diagram of one embodiment of a container module or a section of an image processing module.

FIG. 6A is a block diagram that shows the imaging processing module 18 and the container module 20 in greater detail than FIG. 1. Like reference numbers in FIG. 1, FIG. 6A, FIG. 6B FIG. 7A, FIG. 7B and FIG. 7C indicate like elements. As illustrated in FIG. 6A, the first imaging device 10, the second imaging devices 12, or both, provide input of raw stereo camera images (or raw image data) to the image rectification module 101. In turn, the image rectification module 101 communicates with the stereo correspondence module 103 and the edge detector 105. The edge detector 105 provides an output to the linear Hough transformer 107. The outputs of the stereo correspondence module 103 and the linear Hough transformer 107 are provided to the container localizer 111. The container localizer 111 may access or receive stored (a priori) hitch and container measurements, container dimensions, container volume or other receiving vehicle data from the data manager 109. In one embodiment, the container localizer 111 may receive or access and an estimate of the tongue angle (between the propulsion portion 75 and the storage portion 93 of the receiving vehicle 79) from the angle estimator 113 and stored hitch and container measurements.

Although the image rectification module 101 is shown as part of the container module 20, in an alternate embodiment, the image rectification module 101 or image rectifier may be incorporated into the first imaging device 10, the second imaging device 12, or both. In the another embodiment, the image rectification module 101 (in the image processing module 18 or in the imaging device (10, 12)) provides image processing to the collected image data or raw stereo images to reduce or remove radial lens distortion and image alignment required for stereo correspondence. The radial lens distortion is associated with the radial lenses of the first imaging device 10, the second imaging device 12, or both. The input of the image rectification module 101 is raw stereo image data, whereas the output of the image rectification module 101 is rectified stereo image data.

In one illustrative embodiment, the image rectification module 101 eliminates or reduces any vertical offset or differential between a pair of stereo images of the same scene of the image data. Further, the image rectification module can align the horizontal component (or horizontal lines of pixels of the stereo images) to be parallel to the scan lines or common reference axis of each imaging device (e.g., left and right imaging device) within the first and second imaging devices (10, 12). For example, the image rectification module can remap pixels from initial coordinates to revised coordinates for the right image, left image or both to achieve registration of the images or rectified right and left images of the stereo image. The rectified image supports efficient processing and ready identification of corresponding pixels or objects within the image in the left image and right image of a common scene for subsequent image processing (e.g., by the stereo corresponding module 103).

In one configuration, the stereo correspondence module 103 applies a stereo matching algorithm or disparity calculator to collected stereo image data, such as the rectified stereo image data outputted by the image rectification module 101. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto).

In an illustrative sum of the absolute differences procedure, the right and left images (or blocks of image data or rows in image data) can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

The image processing module 18, or container localizer 111, estimate a distance or range from the first imaging device 10, the second imaging device 12, or both to the pixels or points lying on the container perimeter 81, on the container edge 181, on the spout 89, on the spout end 87, or on any other linear edge, curve, ellipse, circle or object identified by the edge detector 105, the linear Hough transformer 107, or both. For example, the image processing module 18 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

Although the stereo correspondence module 103 is illustrated as part of the container module 20, in an alternate embodiment the stereo correspondence module 103 may comprise a separate module within the image processing system 18 or a disparity module, for example.

In one embodiment, the container module 20 comprises: (1) an edge detector 105 for measuring the strength or reliability of one or more edges 181, or points on the container perimeter 81 in the image data; (2) a linear Hough transformer 107 for identifying an angle and offset of candidate linear segments in the image data with respect to a reference point on an optical axis, reference axis of the one or more imaging devices (10, 12); (3) a container localizer 111 adapted to use spatial and angular constraints to eliminate candidate linear segments that cannot logically or possibly form part of the identified linear segments of the container perimeter 81, or points on the container perimeter 81; and (4) the container localizer 111 transforms the non-eliminated, identified linear segments, or identified points, into two or three dimensional coordinates relative to a reference point or reference frame of the receiving vehicle and harvesting vehicle.

The edge detector 105 may apply an edge detection algorithm to rectified image data from the image rectification module 101. Any number of suitable edge detection algorithms can be used by the edge detector 105. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector 105 may provide a numerical output, signal output, or symbol, indicative of the strength or reliability of the edges 181 in field. For example, the edge detector may provide a numerical value or edge strength indicator within a range or scale or relative strength or reliability to the linear Hough transformer 107.

The linear Hough transformer 107 receives edge data (e.g., an edge strength indicator) related to the receiving vehicle and identifies the estimated angle and offset of the strong line segments, curved segments or generally linear edges (e.g., of the container 85, the spout 89, the spout end 87 and opening 83) in the image data. The estimated angle is associated with the angle or compound angle (e.g., multidimensional angle) from a linear axis that intercepts the lenses of the first imaging device 10, the second image device 12, or both. The linear Hough transformer 107 comprises a feature extractor for identifying line segments of objects with certain shapes from the image data. For example, the linear Hough transformer 107 identifies line equation parameters or ellipse equation parameters of objects in the image data from the edge data outputted by the edge detector 105, or Hough transformer 107 classifies the edge data as a line segment, an ellipse, or a circle. Thus, it is possible to detect containers or spouts with generally linear, rectangular, elliptical or circular features.

In one embodiment, the data manager 109 supports entry or selection of container reference data by the user interface 44. The data manager 109 supports entry, retrieval, and storage of container reference data, such as measurements of cart dimensions, by the image processing module 18 to give spatial constraints to the container localizer 111 on the line segments or data points that are potential edges 181 of the cart opening 83.

In one embodiment, the angle estimator 113 estimates the angle of the storage portion 93 (e.g., cart) of the receiving vehicle 79 to the axis of the direction of travel of the propelled portion 75 (e.g., tractor) of the receiving vehicle 79. The angle estimator 113 provides angular constraints to the container localizer 111 on the lines, or data points, that are potential edges 181 of the container opening 83. In configuration, the angle estimator 113 is coupled to the localizer 111 (e.g., container localizer or Kalman filter). The angle estimator filter 113 outputs, or is capable of providing, the received estimated angle of the storage portion 93 relative to the axis of the direction of travel of the propelling portion 75 of the vehicle.

The localizer 111 is adapted to receive measurements of dimensions of the container perimeter 81 or the storage portion 93 of the vehicle to facilitate identification of candidate linear segments that qualify as identified linear segments of the container perimeter 81. In one embodiment, the localizer 111 is adapted to receive an estimated angle of the storage portion 93 relative to the propelling portion 75 of the vehicle to facilitate identification of candidate linear segments that qualify as identified linear segments of the container perimeter 81. The localizer 111 uses spatial and angular constraints to eliminate candidate lines in the image data that cannot be possibly or logically part of the container opening 83 or container edges 181, then selects preferential lines (or data points on the container edge 81) as the most likely candidates for valid container opening 83 (material therein) or container edges 181. The localizer 111 characterizes the preferential lines as, or transformed them into, three dimensional coordinates relative to the vehicle or another frame of reference to represent a container perimeter of the container 85.

FIG. 6A illustrates an image rectification module 101 or image rectifier that may reside in the imaging device 10. The image rectification module 101 provides a rectified stereo image to the container module 20 for processing. As shown, the container module 10 may receive input data from one or more of the following sources on the receiving vehicle: data manager (e.g., container setup module) 109, odometrical sensor 440, inertial sensor 442, second location-determining receiver 142, or an angle sensor (not shown). A tongue angle sensor, which can be coupled to data bus 60, provides sensor data indicative of a trailer tongue angle or hitch angle at a pivot point between the propulsion portion and the storage portion of the receiving vehicle. The container module 10 uses the input data to estimate a container position or its container perimeter. As used in this document, the container position may comprise any point, reference point, or three dimensional coordinates on or for the container, storage portion, or receiving vehicle.

The data manager 109 stores input data or a priori information data inputted by the user via the user interface 44 on the hitch dimensions and cart dimensions. The container module 20 is adapted to determine the container position by processing one or more of the following input data: (a) sensor data indicative of a trailer tongue angle between the propulsion portion and the storage portion of the receiving vehicle, (b) a heading of the propelled portion, (c) a position (e.g., leading position) of the propelled portion; (d) a position (e.g., trailing position) of the storage portion, and (e) physical vehicle data associated with one or more dimensions of the storage portion, such as the distance between a pivot point of the trailer tongue and wheelbase, and (f) kinematic model data associated with the movement of the storage portion with respect to the propulsion unit. The image processing module 18 may use, retrieve or access previously stored data, such as dimensional parameters related to the receiving vehicle, the dimensional parameters comprising a distance between a trailer hitch and front wheel rotational axis of the storage portion 93. Such dimensional parameters may be entered via a user interface 44 coupled to the vehicle data bus 60 or the image processing module 18, for example.

Figure 6B:
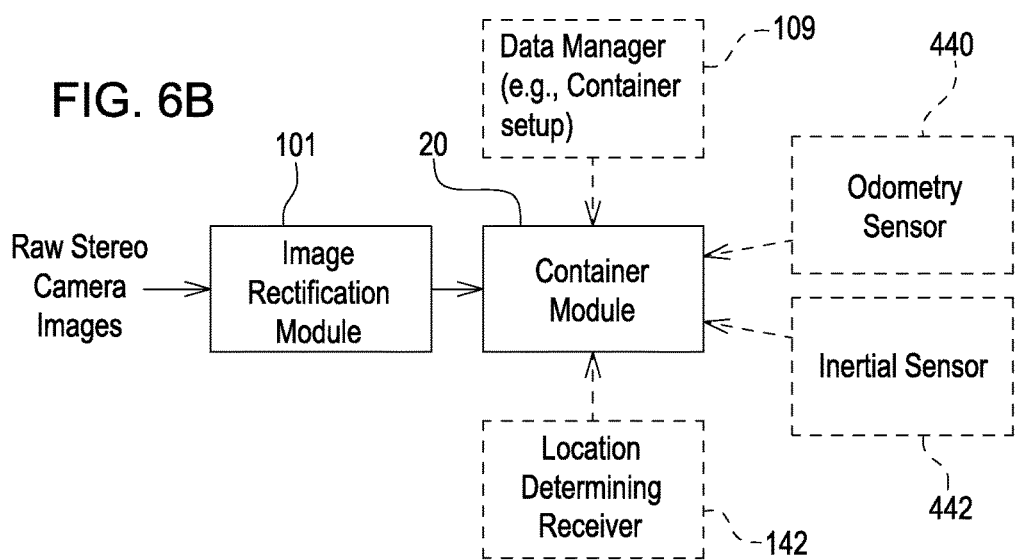
FIG. 6B illustrates a block diagram of another embodiment of a container module or a section of an image processing module.
Figure 6C:
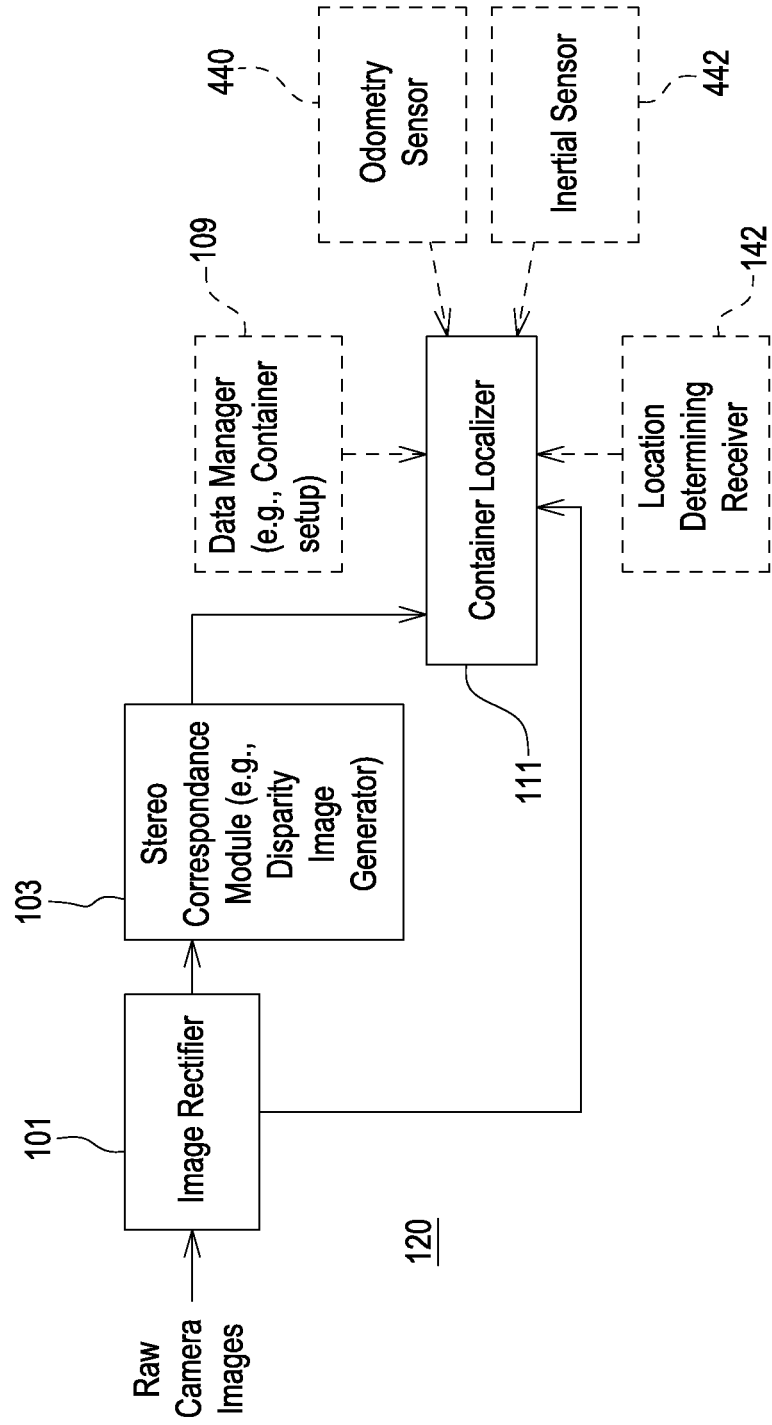
FIG. 6C illustrates a block diagram of yet another embodiment of a container module.

The container module 120 of FIG. 6C is similar to the container module 20 of FIG. 6B, except FIG. 6C further includes a stereo correspondence module 103 (e.g., disparity image generator) coupled between an output of the image rectifier 101 and the input of a container identification module 111. Like reference numbers in FIG. 6B and FIG. 6C indicate like elements. The container module 120 can be substituted for the container module 20 of FIG. 1 through FIG. 3A, inclusive.

The container identification module 111 identifies the container position or the container perimeter based on by processing one or more of the following input data: (a) sensor data indicative of a trailer tongue angle between the propulsion portion and the storage portion of the receiving vehicle, (b) a heading of the propelled portion, (c) a position (e.g., leading position) of the propelled portion; (d) a position (e.g., trailing position) of the storage portion, and (e) physical vehicle data associated with one or more dimensions of the storage portion, such as the distance between a pivot point of the trailer tongue and wheelbase, and (f) kinematic model data associated with the movement of the storage portion with respect to the propulsion unit. One or more of the following sensors can provide the above input data to the container identification module: data manager (e.g., container setup module) 109, odometrical sensor 440, inertial sensor 442, second location-determining receiver 142, or a tongue angle sensor (not shown).

Figure 7A:
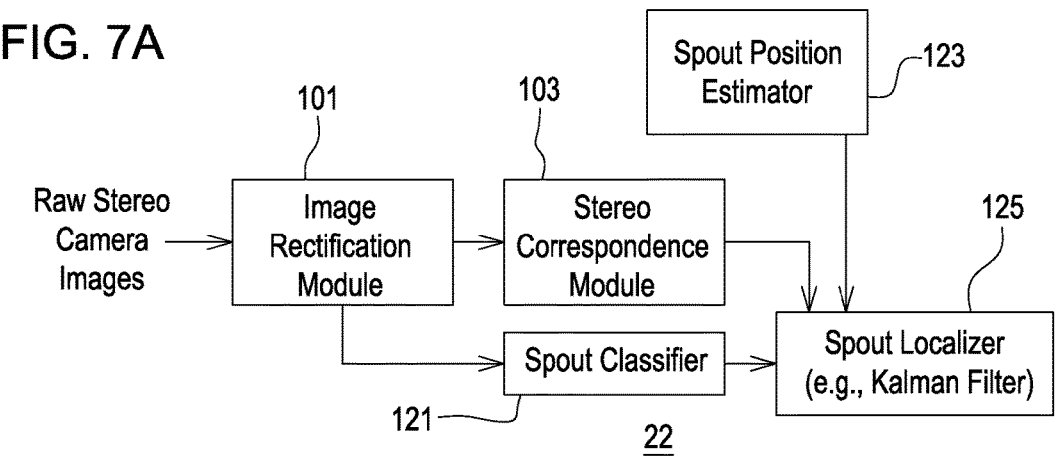
FIG. 7A is a block diagram of one embodiment of a spout module or a section of an image processing module.

FIG. 7A is a block diagram that shows the image processing module 18 and the spout module 22 in greater detail than FIG. 1. Like reference numbers in FIG. 1, FIG. 6, FIG. 7A, FIG. 7B indicate like elements. In FIG. 7A, the image rectification module 101 communicates with the stereo correspondence module 103 and the spout classifier 121. In turn, the spout classifier 121 provides an output to the spout localizer 125. The spout localizer 125 accesses or receives the spout position from angle sensor 115 or the spout position estimator 123 (or spout angle (α) with respect to the transferring vehicle direction of travel or vehicle reference frame), stereo correspondence data from the stereo correspondence module 103, and the output data from the spout classifier 121.

Although the image rectification module 101 is shown as part of the spout module 22, in an alternate embodiment, the image rectification module 101 or image rectifier may be incorporated into the first imaging device 10, the second imaging device 12, or both.

Although the stereo correspondence module 103 is illustrated as part of the spout module 22, in an alternate embodiment the stereo correspondence module 103 may comprise a separate module within the image processing system 18 or a disparity module, for example.

In one embodiment, the spout module 22 comprises a spout classifier 121 that is configured to identify candidate pixels in the image data based at least one of reflectivity, intensity, color or texture features of the image data (or pixels), of the rectified image data or raw image data, where the candidate pixels represent a portion of the spout 89 or spout end 87.

In one configuration, the spout localizer 125 is adapted to estimate a relative position of the spout 89 to the imaging device based on the classified, identified candidate pixels of a portion of the spout 89 or other image processing of the image processing module 18. In another configuration, the spout localizer 125 estimates a relative position of the spout 89 or the spout end 87 based on the following: (1)(a) rotation angle data from the rotation sensor (216 or 266), or (1)(b) a combination of a rotation angle or spout angle (α) from the rotation angle (216 or 266) and a tilt angle from a tilt sensor 268, and (2) a length of the spout 89 from the rotational axis about which the spout 89 rotates. The spout localizer 125 can estimate a combine spout position of the spout end 87 or spout angle (α) relative to the mounting location of the imaging device, or optical axis, or reference axis of one or more imaging devices, based on previous measurements to provide constraint data on where the spout 89 can be located possibly.

The spout classifier 121 applies or includes software instructions on an algorithm that identifies candidate pixels that are likely part of the spout 89 or spout end 87 based on expected color and texture features within the processed or raw image data. For example, in one configuration the spout end 87 may be painted, coated, labeled or marked with a coating or pattern of greater optical or infra-red reflectivity, intensity, or luminance than a remaining portion of the spout 89 or the transferring vehicle. The greater luminance, intensity or reflectivity of the spout end 87 (or associated spout pixels of the image data versus background pixels) may be attained by painting or coating the spout end 87 with white, yellow, chrome or a lighter hue or shade with respect to the remainder of the spout 89 or portions of the transferring vehicle (within the field of view of the imaging devices (10, 12).

In one embodiment, the spout position estimator 123 receives input of previous measurements and container reference data and outputs an estimate of the spout position, spout angle, or its associated error. The spout position estimator 123 provides an estimate of the combine spout position, or spout angle, or its error, relative to one or more of the following: (1) the mounting location or pivot point of the spout on the transferring vehicle, or (2) the optical axis or other reference axis or point of the first imaging device 10, the second imaging device 12, or both, or (3) the axis associated with the forward direction of travel or the heading of the transferring vehicle. In one embodiment, the spout position estimator 123 is coupled to the spout localizer 125.

In one embodiment, the spout localizer 125 comprises a Kalman filter. The Kalman filter outputs constraints on where the spout 89 or spout end 87 can be located, an estimated spout position, or a spout location zone or estimated spout position zone. The spout localizer 125 takes pixels that are classified as belonging to the combine auger spout 89 and uses a disparity image (from stereo correspondence data) to estimate the relative location of the spout to the first imaging device 10, the second imaging device 12, or both, or reference axis or coordinate system associated with the vehicle.

Figure 7B:
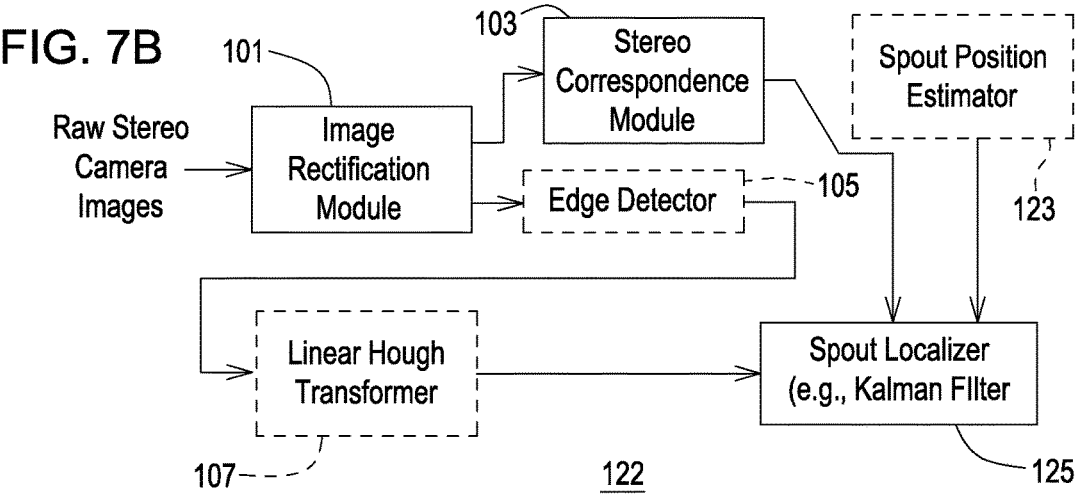
FIG. 7B is a block diagram of another embodiment of a spout module or an image processing module.

FIG. 7B illustrates an alternative configuration of the spout module 122. Spout module 122 is similar to spout module 22 of FIG. 7A, except spout module 22 incorporates some components or blocks that are similar to those in FIG. 6. Like reference numbers indicate like elements in FIG. 1, FIG. 6, FIG. 7A, and FIG. 7B. In FIG. 3A, the spout module 122 of FIG. 7B may be in place of the spout module 22, where the system 311 is mounted on a receiving vehicle, unless the transferring vehicle has a rotation sensor for the spout and transmits the spout rotation angle to the system 311 for processing.

In FIG. 7B, an optional edge detector 105 and an optional linear Hough transformer 107 are shown in dashed lines. The optional edge detector 105 is coupled to the linear Hough transformer 107. In turn, the linear Hough transformer 107 is coupled to the spout localizer 125. The edge detector 105 and the linear Hough transformer 107 function as described above in conjunction with the container module 20 of FIG. 20, except that the processed image data relates to the position or coordinates of the spout 89 and the spout end 87, as opposed to the position of the storage container 93 or its container perimeter 81.

In one embodiment, the edge detector 105, alone or in combination with the Hough transformer 107, detects an edge of the spout 89, or an edge the spout end 87. For example, the detection of the edge of a spout 89 in image data and its corresponding coordinates (e.g., in three dimensions) may provide an indication of the spout angle or rotation angle of the spout, or the orientation of the spout end 87 with respect to the transferring vehicle, or a reference point thereon. The spout module 122 of FIG. 7B can provide the spout angle, a position of the spout 89, or a position (e.g., three dimensional coordinates) of the spout end 87 without any sensor data from the rotation sensor 216 or the rotation sensor 266, although sensor data from any rotation sensor, tilt sensor or deflector sensor associated with the spout may be used to restrict the data for image processing within the collected image data to certain zones or quadrants of interest to more efficiently process the image data.

Figure 7C:
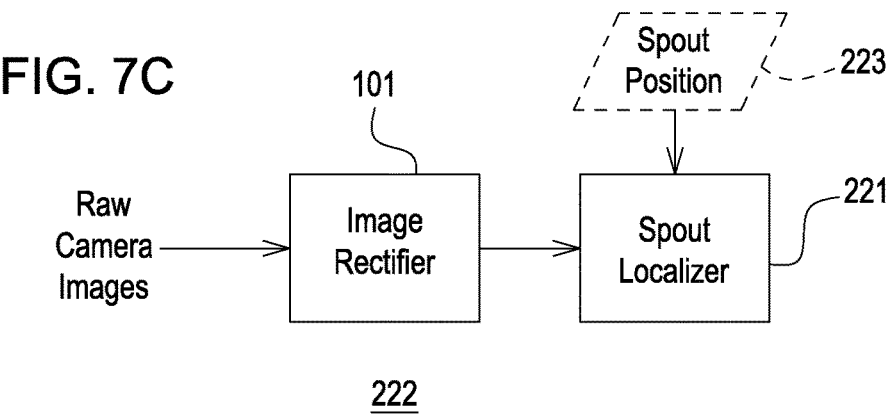
FIG. 7C is a block diagram of yet another embodiment of a spout module or an image processing module.

FIG. 7C shows a block diagram that shows the logical flow of data for a spout module 222 that uses a spout angle sensor for detecting an angle of the spout with respect to the transferring vehicle for estimating a position of the spout end relative to the storage portion. In alternate embodiments, the spout module 222 may be substituted for the spout module 22 in FIG. 1 through FIG. 3A, inclusive.

In FIG. 7C, the rotation sensor (116 or 266) is capable of communicating angle sensor data or a spout rotation angle with a first wireless communications device 48 on the transferring vehicle via a data bus. The first wireless communications device 48 transmits an electromagnetic signal that is modulated with the spout position input data to the second wireless communications device 148. The spout position input data comprises one or more of the following: angle sensor data, spout rotation angle, known spout length, spout tilt angle, and spout deflector status. The spout identification module 221 receives the spout position input data from the second wireless communications device 148 and rectified image data from the image rectification module 101.

Here in FIG. 7C, the rotation sensor 116 or 266 is arranged to sense a rotation angle of the spout on the transferring vehicle. The spout module (e.g., 22) or the system (11, 111, 311 or 411) may estimate a spout position based on the rotation angle and a known length of the spout 89. The known length of the spout may differ by manufacturer and model of the transferring vehicle. The known length of the spout can be: entered or selected by a user or operator into a user interface 44, programmed into the system (11, 111, 311 or 411), and/or even triggered by detection of an radio frequency identifier (RFID) tag on the transferring vehicle that is read by a RFID reader on the receiving vehicle.

The first wireless communications device 48 on the transferring vehicle is arranged for transmitting spout position input data or sensor data indicative of the sensed rotation angle of the spout. The second wireless communications device 148 on the receiving vehicle for receiving the spout position input data or sensor data indicative of the sensed rotation angle. In one embodiment, spout module (e.g., 22) or spout identification module 221 estimates the spout position based on one or more of the following: (1) spout position input data or the sensor data and (2) a known length of the spout.

Figure 7D:
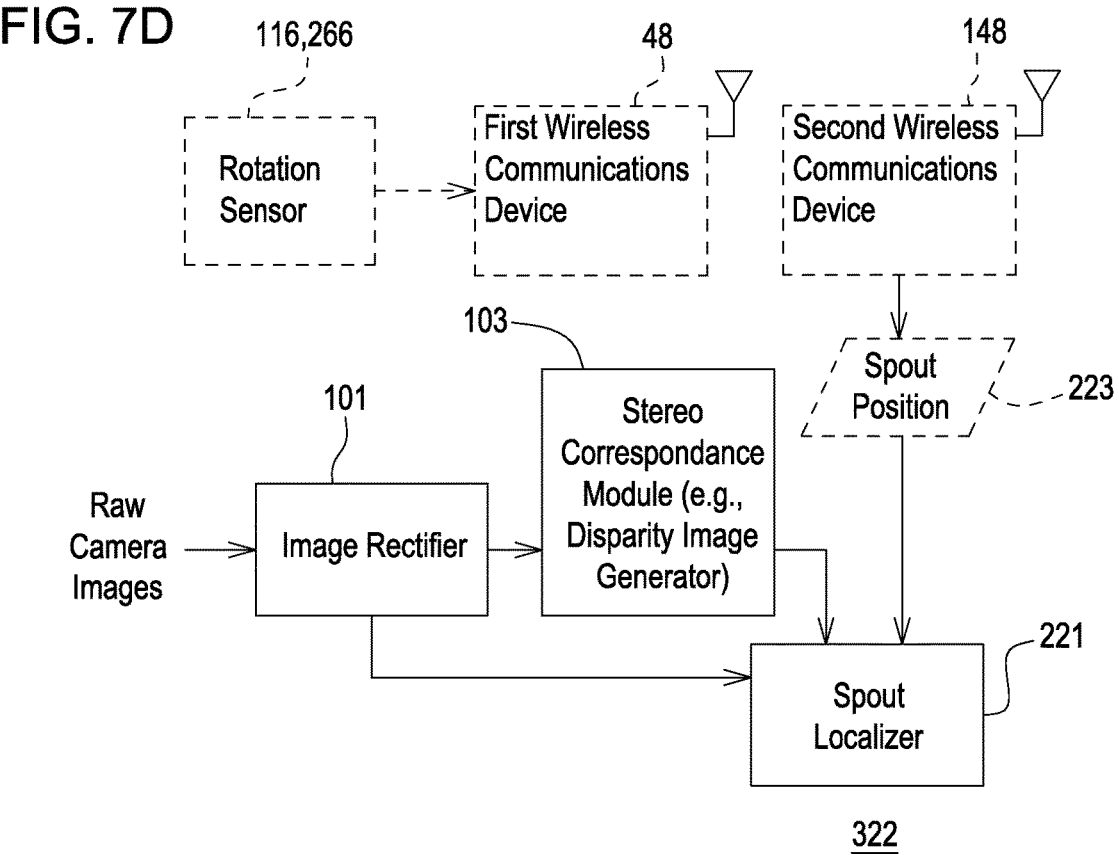
FIG. 7D is a block diagram of another embodiment of a spout module or an image processing module.

The spout module 322 of FIG. 7D is similar to the spout module 222 FIG. 7C, except that the spout module 322 of FIG. 7D further includes the stereo correspondence module 103 (e.g., disparity image generator). Like reference numbers in FIG. 7C and FIG. 7D indicate like elements. In alternate embodiments, the spout module 322 may be substituted for the spout module 222 in FIG. 1 through FIG. 3A, inclusive.

In the embodiment of FIG. 7C, the spout module (e.g., 22) or spout identification module 221 estimates the spout position based on one or more of the following: (1) spout position input data or the sensor data, (2) a known length of the spout, and (3) processing of image data by the image data processing module 18 or the spout module 22 to supplement or complement the spout position that is derived from above items 1 and 2. For example, the image processing module 18 or spout module 22 may identify a spout end of the spout by processing a disparity image of the collected image data during one or more sampling periods. The spout identification module 221 may incorporate various detectors or image processors selected from the group consisting of a pattern identification detector, a color discrimination detector, and an edge detector. If a color or visual pattern is placed on or near the spout end to facilitate distinguishing spout data from background pixel data, the pattern identification detector, color discrimination detector or edge detector may be programmed or trained in a tailored manner to identify readily, quickly and efficiently the spout end or spout position. The image processing module 18 or the spout module 22 may determine the range of the pixels to the first imaging device 10 to estimate coordinates of a spout end 87 or spout position of the spout 89.

Figure 8:
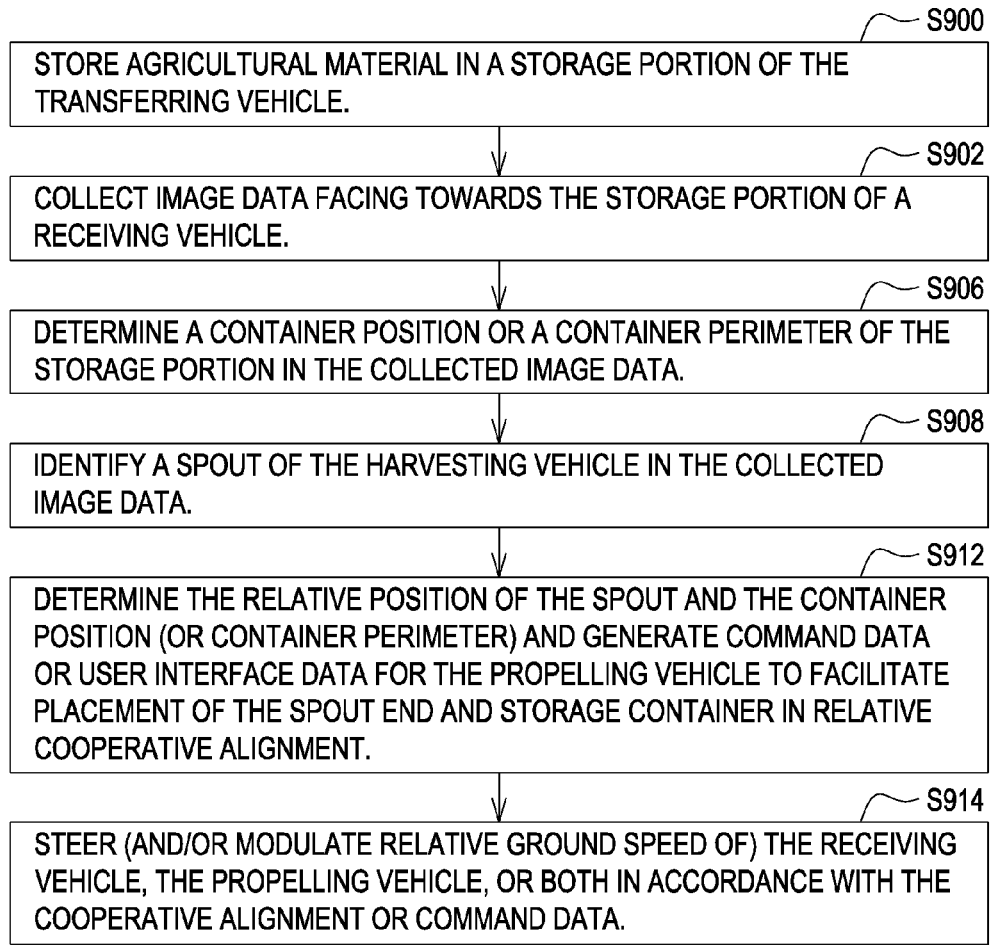
FIG. 8 is a flow chart of an embodiment of a method for operating a machine vision-augmented guidance system for facilitating the unloading or transferring of agricultural material from a vehicle (e.g., combine).

FIG. 8 is a flow chart of a method for facilitating the transferring or unloading of agricultural material from a vehicle or between a transferring vehicle 91 and a receiving vehicle 79. The method of FIG. 8 may begin in step S900 and may use one or more of the following embodiments of the systems (11, 111, 311, or 411) previously disclosed herein.

In step S900, the transferring vehicle 91 (e.g., harvester or combine) stores agricultural material in a storage portion (e.g., grain bin) of the transferring vehicle 91 if the transferring vehicle 91 has a storage portion. For example, the transferring vehicle may store the agricultural material in the storage portion of the transferring vehicle 91 as the transferring vehicle 91 moves forward and harvests crop in a field. As the storage portion or storage vessel (e.g., grain tank) of the transferring vehicle 91 becomes full or near capacity, the receiving vehicle may move along one side of the moving transferring vehicle 91 for unloading of the agricultural material (e.g., consistent with or similar to the illustration of FIG. 4A).

In an alternate embodiment, if the transferring vehicle comprises a forage harvester or does not have a storage portion, the method of FIG. 8 may begin with step S902 instead of S900.

In step S902, the first imaging device 10 faces toward the storage portion of the receiving vehicle 79 (e.g., grain cart) and collects image data (e.g., stereo image data or monocular image data). For example, the imaging device 10 may be mounted on the transferring vehicle 91 facing the receiving vehicle 79 and facing the container 85. In one embodiment, the first imaging device 10 has first field of view (77 in FIG. 4A) of the storage portion of the receiving vehicle 79.

In an alternative embodiment, the first imaging device 10 comprises a monocular imaging device that provides a first image section or image data of a scene or an object.

In step S906, an image processing module 18 or a container module 20 determines a container position or a container perimeter of the storage portion by processing the collected image data, by processing other input data (e.g., first location data, second location data, first motion data, second motion data), or both. As used in this document, the container position may comprise any point, reference point, or three dimensional coordinates on or for the container, storage portion, or receiving vehicle. Step S106 may be carried out in accordance with various techniques, which may be applied alternately or cumulatively. Under a first technique, the image processing module 18 or container module 20 may employ the following processes or sub-steps: (1) measuring a strength of one or more edges 181 in the image data (raw and rectified image data); (2) identifying an angle and offset of candidate linear segments in the image data with respect to an optical axis, reference axis (e.g., direction of travel of the transferring vehicle), or reference point indexed to one or more imaging devices (10, 12); and (3) using spatial and angular constraints to eliminate identified candidate linear segments that cannot logically or possibly form part of the identified linear segments of the container perimeter, where the localizer 111 transforms the identified linear segments into three dimensional coordinates relative to a reference point or reference frame of the receiving vehicle and/or the harvesting vehicle.

Under a second technique, the image processing module 18 or container module 20 may receive container reference data, or measurements of dimensions of the container perimeter 81 or the storage portion 93 of the vehicle, to facilitate identification of candidate linear segments, or candidate data points, that qualify as identified linear segments or edges of the container perimeter 81 in the collected image data during a sampling time period.

Under the third technique, the image processing module 18 or container module 20 may receive an estimated angle 97 of the storage portion 93 relative to the propelling portion 75 of the vehicle to facilitate identification of candidate linear segments that qualify as identified linear segments or identifiable edges of the container perimeter 81 in the collected image data during a sampling period.

Under a fourth technique, the image processing module 18 or container module 20 provides the received estimated angle 97 of the storage portion 93 relative to the propelling portion 75 of the vehicle.

Under a fifth technique, the image processing module 18 identifies a container perimeter 81 of the storage portion 93 in the collected image data (e.g., the first image data or image data), where the storage portion 93 has an opening 83 inward from the container perimeter 81 for receipt of the agricultural material. For example, the image processing module 18 or container module 20 identifies a container perimeter 81 of the storage portion 93 by identifying one or more edges of the container perimeter in the collected image data.

Under a sixth technique, the container module 20 or system (11, 111, 311, 411) is adapted to determine the container position by processing one or more of the following input data: (a) sensor data indicative of a trailer tongue angle between the propulsion portion and the storage portion of the receiving vehicle, (b) a heading of the propelled portion, (c) a position (e.g., leading position in two or three dimensional coordinates) of the propelled portion; (d) a position (e.g., trailing position in two or three dimensional coordinates) of the storage portion, (e) first location data, second location data, or both from the location-determining receivers (42, 142), (f) first motion data, second motion data, or both from the location-determining receivers (42, 142), (g) physical vehicle data associated with one or more dimensions of the storage portion, such as the distance between a pivot point of the trailer tongue and wheelbase, or (h) kinematic model data (e.g., vehicle steering model or modified bicycle model) associated with the movement of the storage portion with respect to the propulsion unit.

In step S908, the image processing module 18 or a spout module 22 identifies a spout 89 (or spout end 87) of the transferring vehicle (e.g., harvesting vehicle) in the collected image data to determine the spout position (e.g., of the spout end 87). The spout position may comprise any point, reference point, or three dimensional coordinates on or for the spout 89 or the spout end 87. The image processing module 18 or the spout module 22 may use various techniques, which may be applied alternately or cumulatively. Under a first technique, image processing module 18 or the spout module 22 identifies a spout end of the spout via at least one detector selected from the group consisting of a pattern identification detector, a color discrimination detector, and an edge detector, where a color or visual pattern is placed on or near the spout end to facilitate distinguishing spout data from background pixel data.

Under a second technique, the image processing module 18 or the spout module 22 identifies candidate pixels in the image data (e.g., rectified or raw image data) based on expected color and expected texture features of the image data, where the candidate pixels represent a portion of the spout 89 (e.g., combine auger spout) or spout end 87.

Under a third technique, the image processing module 18 or the spout module 22 estimates a relative position, or relative angle, of the spout 89 or the spout end 87, to the imaging device based on the classified, identified candidate pixels of a portion of the spout 89. The image processing module 18 or a stereo correspondence module 103 may determine the range or coordinates (e.g., three dimensional coordinates) to identified candidate pixels of the first, second or third technique, points on the spout, or a constellation of points on the spout from a disparity image.

Under a fourth technique, the image processing module 18 or the spout module 22 receives an estimated combine spout position, or spout angle, relative to the mounting location, optical axis, reference axis, or reference point of the imaging device (10, 12). For instance, the estimated spout position, or spout angle may be based on previous measurements to provide constraint data on where the spout 56 can be located possibly. Alternately, sensor data from the rotation sensor (116 or 266) may be wirelessly transmitted from system 11 or 111 on the transferring vehicle to the receiving vehicle via the first wireless communications device 48 and the second wireless communications device 148.

Under a fifth technique, the image processing module 18 or spout module 22 provides the estimated combine spout position, or estimated spout angle, to the spout localizer 125, where the spout module 22 or the spout localizer 125 determines the range of the pixels to the first imaging device to estimate coordinates of a spout end of the spout.

Under a sixth technique, the spout module does not use a spout angle sensor for detecting an angle of the spout with respect to the transferring vehicle for estimating a position of the spout end relative to the storage portion.

In step S912, the image processing module 18 or the alignment module 24 determines the relative position of the spout 89 (e.g., the spout end 87) and the container position (or container perimeter 81) to generate command data or user interface data for the propelled portion to facilitate placement of the spout 89 (e.g., the spout end 87) and the storage portion in cooperative alignment (or target alignment for transferring of material from the transferring material to the receiving vehicle). Cooperative alignment refers to an alignment of the spout end 87 and storage portion that is suitable for efficient or effective transferring of material from the transferring vehicle to the receiving vehicle, where the spout 89 (e.g., spout end 87) is aligned with a central zone 83 or another target zone of storage portion or its container perimeter 81.

Under a first procedure for carrying out step S912, the image processing module 18 or the alignment module 24 is adapted to provide command data or user interface data to align the spout 89, the spout end 87, or the spout position within the container position by controlling a position of the receiving vehicle or its storage portion. Under a second procedure which can be applied cumulatively or separate from the first procedure, the image processing module 18 or the alignment module 24 is adapted to provide command data or user interface data to align the spout 89, the spout end 87, or the spout position inside the container perimeter by controlling a position of the receiving vehicle or its storage portion.

In step S914, in a first configuration, the controller (59 or 159) or the steering controller 32 steers (and/or modulates the relative ground speed of the vehicles) the receiving vehicle in accordance with the cooperative alignment or the command data. In a second configuration, the vehicle controller or the steering controller 32 may steer the transferring vehicle in accordance with the cooperative alignment or the command data. In a third configuration, the vehicle controller (59 or 159) or steering controllers 32 of both the transferring vehicle 91 and the receiving vehicle 79 steer both vehicles in accordance with the cooperative alignment, or maintenance of a target spatial offset suitable for unloading or transfer of the material between the vehicles. In a fourth configuration, the actuator 210 (e.g., a servo-motor, electric motor, linear motor and linear-to-rotational gear assembly, or electro-hydraulic device) controls the spout angle of the spout 89, or the spout end 87, with respect to the direct of travel or another reference axis of the transferring vehicle in response to alignment module 24 or the image processing module 18 (e.g., smart unloading controller).

Figure 9:
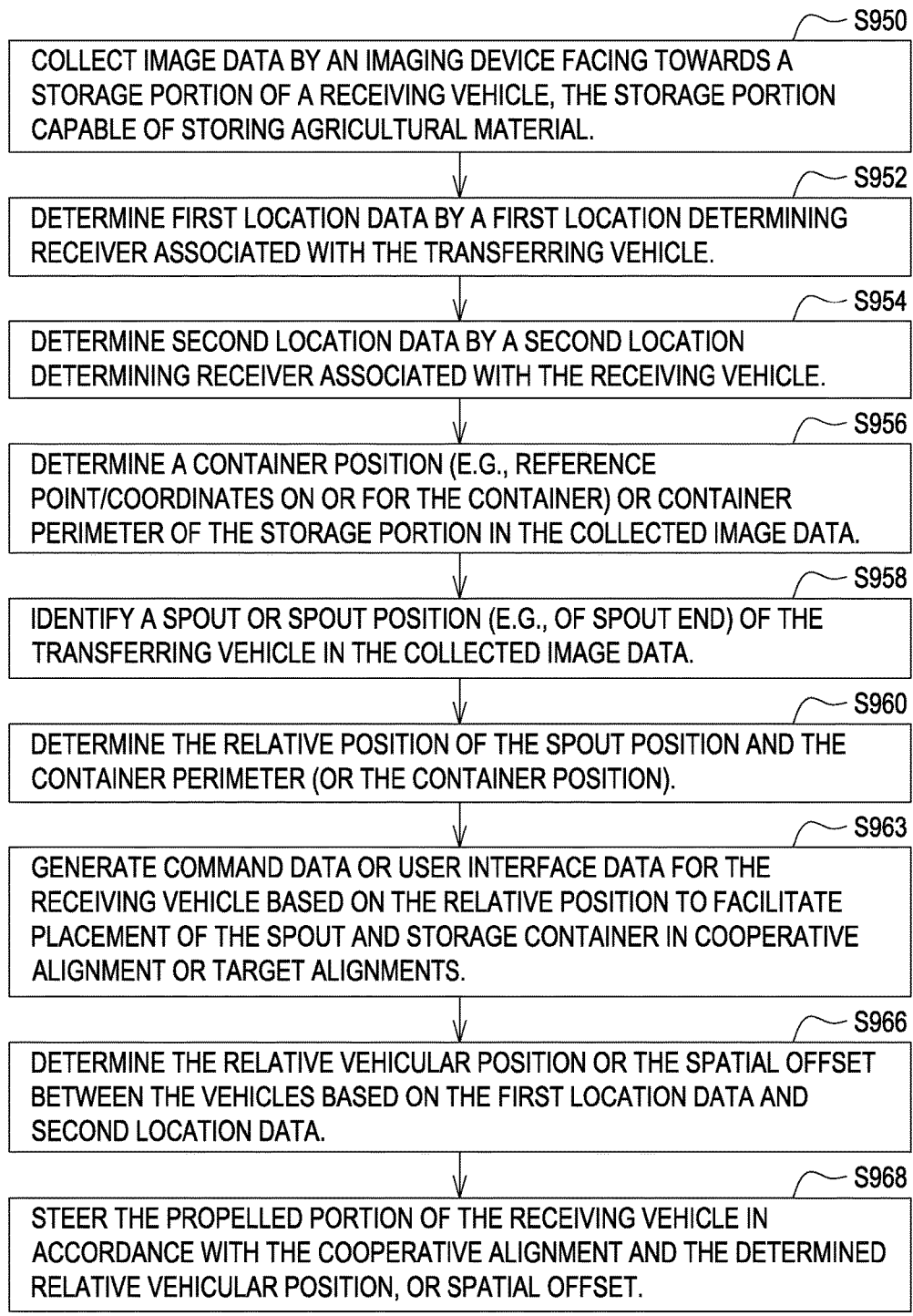
FIG. 9 is a flow chart of an embodiment of a method for operating a machine vision-augmented guidance system for facilitating the unloading or transferring of agricultural material from a vehicle (e.g., combine).

FIG. 9 illustrates an embodiment of a method for facilitating the transfer of agricultural material from a transferring vehicle to a receiving vehicle. Like reference numbers in FIG. 9 and any other drawing herein indicate like steps, procedures or elements. The method of FIG. 9 begins in step S950.

In step S950, an imaging device (10, 12) collects image data and faces towards a storage portion 93 of a receiving vehicle 79, where the storage portion 93 is capable of storing agricultural material. For instance, the collected image data may include scenes or representations of the storage portion 93, the container perimeter 81, the spout 89, the spout end 87, wheels of the receiving vehicle 79, and contents or agricultural material within an interior of the container 85, among other things.

In step S952, a first location-determining receiver 42, which is associated with the transferring vehicle 91, determines first location data. The first location-determining receiver 42 may determine heading data, velocity data and acceleration data for the transferring vehicle 91. The first location data is typically determined with reference to an antenna of the first location-determining receiver 42 that is mounted on or associated with the transferring vehicle 91. In an alternate embodiment, the first location-determining receiver 42 determines first location data and first motion data (e.g., velocity, acceleration, heading or yaw angle, tilt angle, roll angle).

In step S954, a second location-determining receiver 142 determines second location data. The second location-determining receiver 142 is associated with the receiving vehicle 79, or its storage portion 93. The second location-determining receiver 142 may determine heading data, velocity data and acceleration data for the receiving vehicle 79. The second location data is typically determined with reference to an antenna of the second location-determining receiver 142 that is mounted on or associated with the transferring vehicle 91. In an alternate embodiment, the second location-determining receiver 142 determines second location data and second motion data (e.g., velocity, acceleration, heading or yaw angle, tilt angle, roll angle).

In step S956, a container module 20 or image processing module 18 identifies a container position or a container perimeter 81 of the storage portion 93 in the collected image data. Container position means a reference point or three dimensional coordinates on or for the storage portion or the receiving vehicle. For example, the container position may comprise three dimensional coordinates for a reference point or spatial position that lies on a projected surface area above the storage portion, where the reference point is a target zone for receiving material from the transferring vehicle. Although the reference point can be defined as a central zone or geometric mean of an opening area at the top of the storage container, in alternate embodiments the reference point can be aligned with any target zone for receiving material from the transferring vehicle. The container module 20 operates as discussed in conjunction with FIG. 6, for example.

In step S958, a spout module 22 and the image processing module 18 identifies (if possible) a spout or spout position of the transferring vehicle 91 in the collected image data. As used throughout this document, the spout position refers to the position of a spout end or one or more reference points or three dimensional coordinates on or for the spout of the transferring vehicle. For example, the spout position may comprise a reference point (e.g., central point) or spatial position that lies on a projected surface area at an opening in the spout end 87. If the opening in the spout end 87 is circular or elliptical, the reference point may be located at the center of the circle or at the intersection of the major and minor perpendicularly oriented axes for the ellipse, for instance. The spout module 22 operates as discussed in conjunction with FIG. 7, for example.

In step S960, the alignment module 24 or the image processing module 18 determines (if possible) the relative position of the spout 89 (or the spout end 87) and the container position (or container perimeter 81). For example, the alignment module 24 or the image processing module 18 may determine the relative position by determining the difference between the spout position and the container position (e.g., by vector addition or subtraction of three dimensional coordinates).

In step S963, the alignment module 24 or the image processing module 18 generates command data or user interface data for the receiving vehicle based on the relative position to facilitate placement of the spout and the storage container in cooperative alignment or target alignment. For example, the command data is transmitted to one or more of the following: steering controller 32, the braking controller 36, and the propulsion controller 40 of the receiving vehicle to control its heading, position, velocity or acceleration to facilitate placement of the spout and the storage container in cooperative alignment or target alignment. Alternately, if command data is not transmitted, user interface data is provided, outputted or displayed to an operator of the receiving vehicle on its user interface 44 such that the operator can manually control the steering system 30, the braking system 34, and the propulsion system 38 to control its heading, position, velocity or acceleration to facilitate placement of the spout and the storage container in cooperative alignment or target alignment.

Cooperative alignment can mean that the spout 89 or spout end 87 is aligned within a target zone or central zone of the container perimeter 81 for unloading or transferring material between the vehicles. For example, the target zone may be static or mobile during the transfer of agricultural material from the spout 89 of the transferring vehicle 91 into the storage portion 93 of the receiving vehicle 79, where a static target zone may be associated with a particular storage portion (93) with a corresponding maximum width, maximum length, or maximum dimension less than critical threshold and where the mobile target zone may be associated with a particular storage portion (93) with a maximum width, maximum length or maximum dimension greater than or equal to the target zone. The maximum width, maximum length, maximum dimension and critical threshold are stored as container data in the data storage device 19 of the image processing system 18, for example. The image processing module 18 or alignment module 24 can process the container data to yield command data to adjust or control the relative spatial offset between the vehicles.

In step S966, a master/slave controller 59 or coordination module 57 determines the relative vehicular position or spatial offset between the vehicles (79, 91) based on the first location data and second location data of the location-determining receivers (42, 142). Further, the master/slave controller 59 or coordination module may use first motion data and second motion data of the location-determining receivers (42, 142) to account for time-varying changes in velocity or acceleration that can impact the relative vehicular position (e.g., in a time series or series of sampling intervals of the system 11, 111, 311 or 411). The master/slave controller 59 or coordination module 57 may also consider the relative headings of the vehicles, the path plan of the transferring vehicle 91, and the path plan of the receiving vehicle 79 to establish the relative vehicular position or spatial offset of the vehicles.

In step S966, the controller (59 or 159) or coordination module 57 generates command data to steer the propelled portion and to direct the storage portion to maintain a target spatial offset between the vehicles consistent with the cooperative alignment such that the spout is aligned within the target zone.

To execute step S966, the imaging processing module 18 may use first location data of a first location-determining receiver 42 on the transferring vehicle and second location data of a second location-determining receiver 142 on the receiving vehicle to determine one or more of the following: (1) a relative spatial separation between fixed reference points (e.g., antennas of the location-determining receivers (42, 142)) on the receiving and transferring vehicles, (2) relative alignment between the spout position and the container position (e.g., container perimeter), (3) spatial separation and angle between reference points on the transferring vehicle and receiving vehicle to achieve relative alignment or target spatial offset between the spout 89 and the container perimeter 81 to support reliable unloading or transferring of agricultural material into the container 85 of the receiving vehicle from the spout.

In step S968, a steering controller 32, alignment module 24, or master/slave controller 59 steers the propelled portion 75 of the receiving vehicle 79 in accordance with the cooperative alignment and the determined relative vehicular position or spatial offset (e.g., Φ or φ; Δ in FIG. 4) of the vehicles (79, 91).

Figure 10:
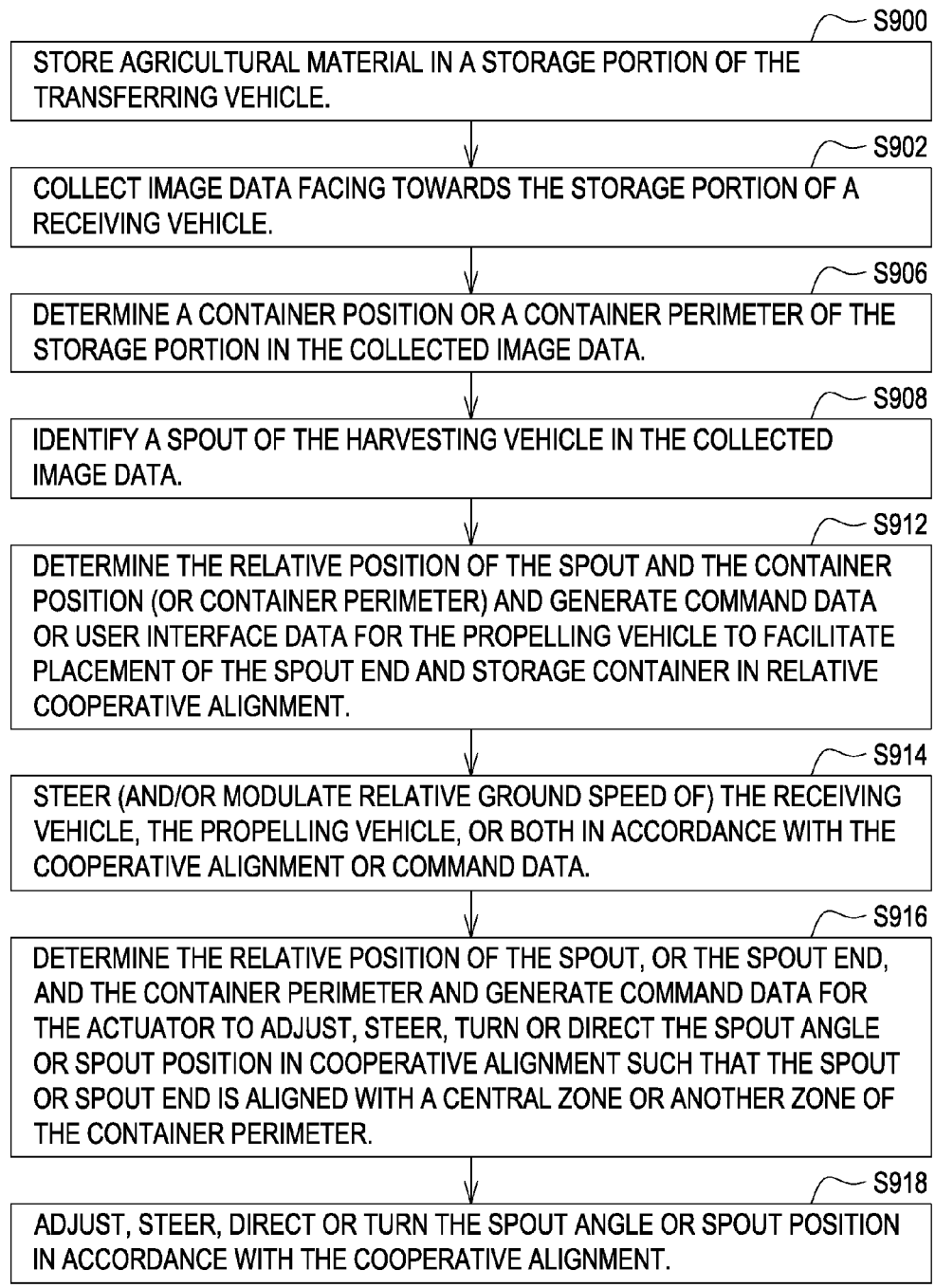
FIG. 10 is a flow chart of an embodiment of a method for operating a machine vision-augmented guidance system for facilitating the unloading or transferring of agricultural material from a vehicle (e.g., combine).

FIG. 10 is a flow chart of a method for facilitating the unloading of agricultural material from a vehicle or between a transferring vehicle (91) and a receiving vehicle (79). The method of FIG. 10 may begin in step S900 and may use one or more of the following embodiments of the systems (11, 111, 311, or 411) previously disclosed herein.

The method of FIG. 10 is similar to the method of FIG. 8, except the method of FIG. 10 adds steps S916 and S918. Like reference numbers in FIG. 8 and FIG. 10 indicate like elements.

In step S916, the image processing module 18 or the alignment module 24 determines the relative position of the spout 89, or the spout end 87, and the container position (or container perimeter 81) and generates command data for the actuator 210 of the auger rotation system 16 of system 11 or the rotation actuator 260, tilt actuator 262 and deflector actuator 264 of system 111 to adjust, steer, turn or direct the spout angle or spout position the in cooperative alignment such that the spout 89 (or spout end 87) is aligned with a central zone or another target zone of the storage portion or its container perimeter 81.

In one embodiment, the system (11, 111, 311, 411) or alignment module 24 first establishes the relative position or alignment between the two vehicles (e.g., the transferring vehicle and the receiving vehicle in steps S912 and S914). Second, in step S916 the system (11, 111, 311, or 411) or alignment module 24 uses the spout rotation (of the spout angle) via the auger rotation system 16 to adjust the area or zone that the agricultural material is unloaded into the receiving vehicle. For minor adjustments or filling of a particular area or volume of the storage portion, the alignment module 24 primarily uses the spout rotation (of the spout angle) via the auger rotation system 16 to adjust the area or zone of the storage portion that the agricultural material is unloaded into the receiving vehicle. The use of the spout rotation may be more efficient than realigning the spatial separation between the transferring and receiving vehicle (e.g., by steering one or both vehicles), where the spout end can accomplish the same alignment between the spout end and container perimeter.

In one configuration, the default spout angle or position for the spout is at approximately 90 degrees to the direction of travel of the transferring vehicle or a vertical plane that is aligned with the axis of rotation of the spout. For some transferring vehicles, the spout angle may be limited in its range (e.g., plus or minus 20 degrees from the perpendicular angle). For example, if the transferring vehicle is a combine, it may only be permitted to rotate approximately twenty degrees clockwise from perpendicular or within a range from approximately seventy degrees to approximately 90 degrees from the direction of travel of the transferring vehicle. The end of the auger traces an arc as it rotates.

In step S918, in a first configuration, the vehicle controller 46 or actuator 216 adjusts, steers, directs or turns the spout angle or spout position in accordance with the cooperative alignment. Because of limitations in the rotation angle of the spout 89, in one embodiment, the alignment module uses both spout angle adjustment and relative position adjustment of the vehicles to achieve complete, uniform and evenly distributed loading of the storage portion 93 of the receiving vehicle 79. Accordingly, steps S912 and S914 may be repeated or invoked by steps S916 or S918, Although the relative position adjustment of the vehicles may be minimized fore and aft adjustment, lateral adjustment of vehicle positions may be necessary to supplement spout angle adjustment for long, wide, or large storage portions, containers or receiving vehicles to facilitate uniform or even loading. Therefore, the relative velocity between the transferring vehicle and receiving vehicle may be adjusted regularly, periodically, or on demand in order to execute a fill strategy or uniform filling operation.

Figure 11:
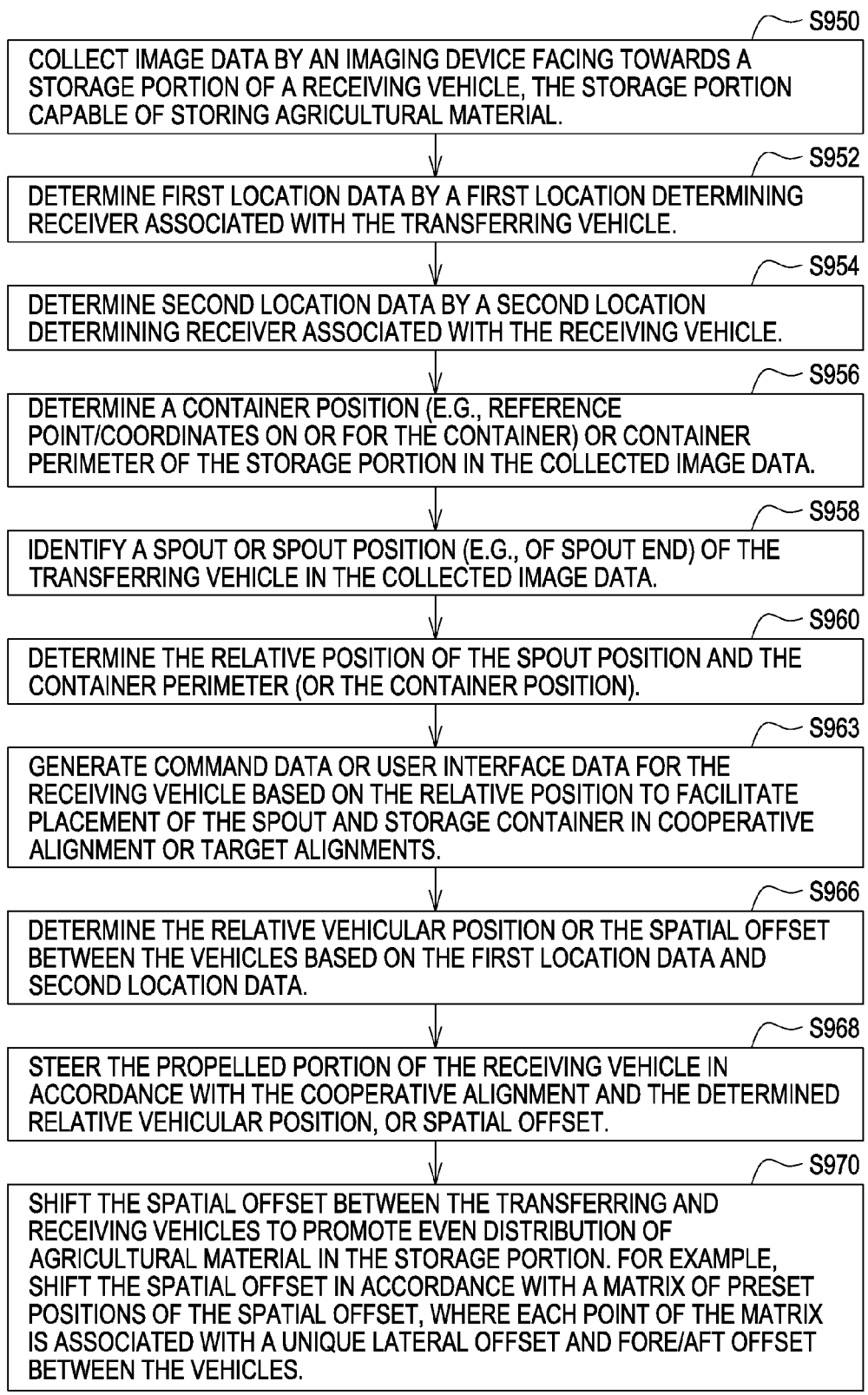
FIG. 11 is a flow chart of an embodiment of a method for operating a machine vision-augmented guidance system for facilitating the unloading or transferring of agricultural material from a vehicle (e.g., combine).

The method of FIG. 11 is similar to the method of FIG. 9, except the method of FIG. 11 further comprises step S970. Like reference numbers indicate like steps or procedures in FIG. 11 and FIG. 9.

Step 970 may be executed after, during or before step S968. In step S970, the steering controller 32, alignment module 24, or master/slave controller 59 steers the propelled portion 75 of the receiving vehicle 79 to shift the spatial offset (e.g., Φ or φ, Δ in FIG. 4) between the transferring and receiving vehicles (79, 91) to promote even distribution of agricultural material in the storage portion 93. For example, the spatial offset is shifted in accordance with a matrix (e.g., multi-dimensional matrix) of preset positions of the spatial offset, where each point of the matrix is associated with a unique lateral offset ($\Delta$) and fore/aft offset ($\Phi$ or $\varphi$) between the vehicles (79, 91). The preset positions (or relative spatial offsets of the vehicles) may be offset from each other by a uniform spatial increment or an equidistant amount. The matrix may comprise a 2×2 matrix with four unique relative vehicular positions, a 2×3 matrix with six unique relative vehicular positions, or a 3×3 matrix with nine unique relative vehicular positions, or any other suitable size of a matrix for the relative positions of the transferring vehicle and the receiving vehicle.

Figure 12:
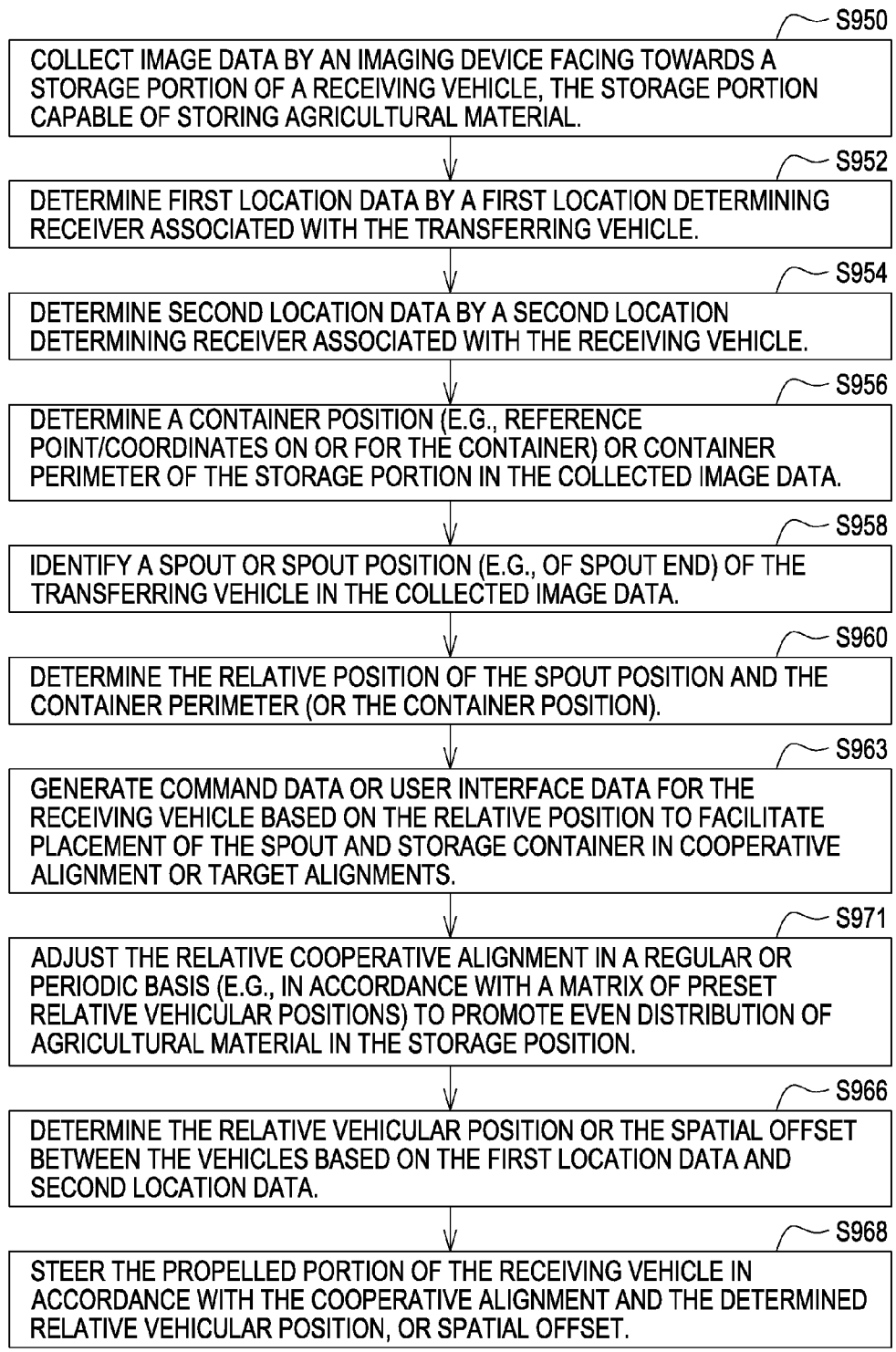
FIG. 12 is a flow chart of an embodiment of a method for operating a machine vision-augmented guidance system for facilitating the unloading or transferring of agricultural material from a vehicle (e.g., combine).

The method of FIG. 12 is similar to the method of FIG. 9, except the method of FIG. 12 adds step S971. Like reference numbers indicate like steps or procedures in FIG. 12 and FIG. 9.

In step S971, an alignment module 24 or controller (59 or 159) adjusts the relative cooperative alignment on a regular or periodic basis (e.g., in accordance with a matrix of preset relative vehicular positions) to promote even distribution of agricultural material in the storage portion 93. For example, the material profile module 27 or image processing module 18 may provide a profile or distribution (e.g., height or a height versus two-dimensional position) of agricultural material (e.g., in two dimensions or three dimensions, such as the illustrative exemplary distributions of FIG. 5C) within the storage portion 93 and the alignment module 24 or controller (59, 159) may shift, move, adjust, or sweep relative vehicular position or the spatial offset within a spatial offset range (e.g., with adequate safety clearance about the vehicles to avoid collision) to direct the agricultural material toward empty or less full volumetric portions (e.g., lower height areas of agricultural material) of the container 85.

Figure 13:
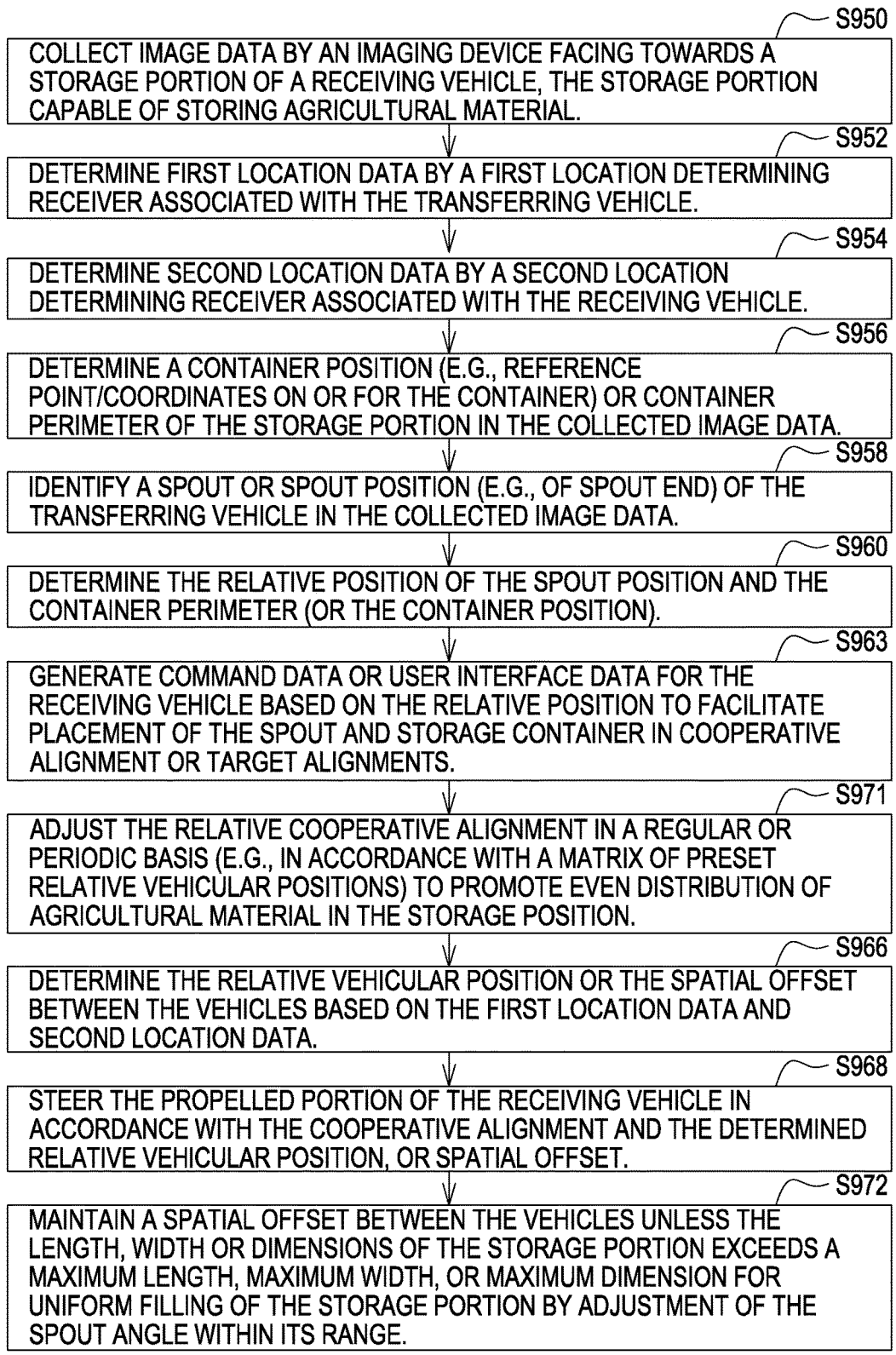
FIG. 13 is a flow chart of an embodiment of a method for operating a machine vision-augmented guidance system for facilitating the unloading or transferring of agricultural material from a vehicle (e.g., combine).

The method of FIG. 13 is similar to the method of FIG. 9, except the method of FIG. 13 further comprises step S971 and S972. Like reference numbers indicate like steps or procedures in FIG. 9, FIG. 12 and FIG. 13.

In step S972, a steering controller 32, alignment module 24, or master/slave controller (59 or 159) steers the propelled portion 75 to maintain a spatial offset (e.g., lateral offset ($\Delta$) and fore/aft offset ($\Phi$ or $\varphi$)) between the vehicles (79, 91) unless the length, width or dimensions of the storage portion exceeds a respective maximum length, maximum width, or maximum dimension for uniform filling of the storage portion 93 by adjustment of the spout angle within its range. If the observed length, width or dimensions of the storage portion 93 exceed a respective maximum length, maximum width or maximum dimension stored in the data storage device 19, a material profile module 27, an image processing module 20, or a distributed fill state sensor 149 monitors a profile of the agricultural material in the storage portion 93 to provide profile data for changing, adjusting, or rotating the spout angle to promote even distribution of the agricultural material in the storage portion 93 by directing the spout end toward a particular volume or area of the storage portion 93 that contains less agricultural material than another volume or area of the storage portion 93.

For the methods of FIG. 8 through FIG. 13, inclusive, a master/slave controller 59 of the transferring vehicle 91 can facilitate automatic guidance of the transferring vehicle 91 via an auto-guidance module 55 in accordance with a path plan in a lead mode. In one mode, if the master/slave controller 59 is configured, programmed or operated as a master/slave controller, then the slave/master/slave/master controller 159 is configured, programmed or operated as a slave controller. Conversely, in another mode where the master/slave controller 59 is configured, programmed or operated as slave controller, then the slave/master/slave/master controller 159 is configured, programmed or operated as a master/slave controller. In either case, the master/slave controller sends command data wirelessly to the slave controller via the wireless communication devices (48, 148) such that one vehicle (transferring or receiving vehicle) with the master/slave controller operates a leader vehicle and the other vehicle with the slave controller operates as a follower vehicle.

The master/slave controller 59 or auto-guidance module 55 estimates an error between the path plan and an actual path and actual heading of the transferring vehicle 91 as measured by the first location-determining receiver 42. Meanwhile, a slave/master/slave/master controller 159 of a receiving vehicle can facilitate tracking of the path plan (e.g., delayed by a relatively stable temporal offset) by the receiving vehicle 79 in a follower mode. The slave/master/slave/master controller 159 or auto-guidance module 155 estimates an error between the path plan and an actual path and actual heading of the receiving vehicle 79 as measured by the second location-determining receiver 142. The lead vehicle transmits a data message for steering the receiving vehicle 79 in accordance with the cooperative alignment.

Although the imaging devices (10, 12) are susceptible to transitory sunlight, shading, dust, reflections or other lighting conditions that can temporarily disrupt proper operation of the imaging devices in an agricultural environment; the system and methods disclosed in this document are well suited for reducing or eliminating the deleterious effects associated with material changes in ambient light conditions. Accordingly, the system and methods disclosed in this document support accurate guidance and alignment of the spout and the counter even where ambient light conditions fluctuate.

The method and system is well suited for enhancing the efficiency of unloading of a transferring vehicle (e.g., combine) to a receiving vehicle (e.g., tractor pulling a grain cart) by facilitating the velocity or speed matching of the vehicles via position data from location-determining receivers, where fine tuning of the alignment of the spout end and the container perimeter is supported by image data from one or more imaging devices. In the absence of the method and system disclosed herein, the operator of the receiving vehicle tends to set a constant speed that is below the optimal speed for harvesting to avoid spilling agricultural material on the ground and missing the container of the receiving vehicle. Accordingly, the method and system is well suited for reducing the time to harvest a field and to collect the grain than otherwise possible.

Having described the preferred embodiment, it will become apparent that various modifications can be made without departing from the scope of the invention as defined in the accompanying claims.

The following is claimed:

1. A system for facilitating the transfer of agricultural material from a transferring vehicle to a receiving vehicle, the system comprising:
   a receiving vehicle comprising a propelled portion for propelling the receiving vehicle and a storage portion for storing agricultural material;
   a spout operably connected to a transferring material for transferring the agricultural material to the receiving vehicle;

a stereo imaging device facing towards the storage portion of the receiving vehicle, the imaging device collecting image data to determine three dimensional coordinates of the spout in the image data;

an image processing module comprising a container module and a spout module;

the container module for determining a container position of a container perimeter or the container position of the storage portion, where the container position comprises a reference point or three dimensional coordinates;

the spout module for identifying the spout of the transferring vehicle in the collected image data by applying edge detection in a region of discontinuities in pixel color or pixel intensity in the collected image data to identify edges of the spout to provide an angular orientation of the spout with respect to the transferring vehicle; and an alignment module for determining the relative position of the spout and the container based on the collected image data and for generating command data or user interface data for the receiving vehicle with a target spatial offset between the spout and the container perimeter, the command data or user interface data being for placement of the spout and storage portion in relative cooperative alignment within a central zone of the container perimeter or target alignment of a target area of the storage portion, for transferring of material from the transferring vehicle to the receiving vehicle.

2. The system according to claim 1 further comprising:
a first location-determining receiver associated with the transferring vehicle for providing first location data on the transferring vehicle;
a second location-determining receiver associated with the receiving vehicle for providing second location data on the receiving vehicle;
a coordination module for determining the relative position or a spatial offset of the vehicles, based on the first location data and second location data, and for generating command data to steer the propelled portion and to direct the storage portion to maintain a target spatial offset between the vehicles consistent with the cooperative alignment such that the spout is aligned within the target zone; and
a steering controller associated with a steering system of the propelled portion for steering the receiving vehicle in accordance with the cooperative alignment and the spatial offset.

3. The system according to claim 1 wherein the container module is adapted to determine the container position by processing one or more of the following input data: (a) sensor data indicative of a trailer tongue angle between the propulsion portion and the storage portion of the receiving vehicle, (b) a heading of the propelled portion, (c) a position of the propelled portion; (d) a position of the storage portion, and (e) physical vehicle data associated with one or more dimensions of the storage portion, such as the distance between a pivot point of the trailer tongue and wheelbase, and (f) kinematic model data associated with the movement of the storage portion with respect to the propulsion unit.

4. The system according to claim 1 where the container module is adapted to identify the container perimeter of the storage portion in the collected image data by identifying one or more edges of the container perimeter in the collected image data.

5. The system according to claim 1 wherein the spout is aligned within a target zone or central zone of the storage portion inside the container perimeter by controlling a position of the receiving vehicle or its storage portion.

6. The system according to claim 1 wherein the alignment module adjusts the relative cooperative alignment or spatial offset between the vehicles within a range to promote even distribution of agricultural material in the storage portion.

7. The system according to claim 1 wherein the alignment module and the coordination module cooperate to shift the spatial offset between the transferring and receiving vehicles to promote even distribution of agricultural material in the storage portion.

8. The system according to claim 7 wherein the spatial offset is shifted in accordance with a matrix of preset positions of the spatial offset, where each point of the matrix is associated with a unique lateral offset and fore/aft offset between the vehicles.

9. The system according to claim 1 wherein the coordination module maintains a spatial offset between the vehicles unless an observed length, width or other dimension of the storage portion exceeds respective maximum length, maximum width, or maximum dimension for uniform filling of the storage portion by adjustment of the spout angle within its angular range.

10. The system according to claim 1 wherein the imaging device is mounted on the propelled portion of the receiving vehicle.

11. The system according to claim 1 wherein the imaging device is mounted on an adjustable mast on the propelled portion of the receiving vehicle, where the adjustable mast has an adjustable height and an adjustable down-tilt or declination angle for the imaging device with respect to a vertical axis.

12. The system according to claim 11 wherein the imaging device has a tilt sensor to measure the down-tilt or declination angle for reporting to a mast controller.

13. The system according to claim 1 wherein the imaging device is mounted with a down-tilt angle to avoid washout of, corruption of, or interference with collected image data during a transient exposure time period to sunlight, a reflection or a light source that exceeds a threshold brightness level for a material portion of the pixels in the collected image data.

14. The system according to claim 1 wherein the spout module identifies a spout end of the spout via at least one detector selected from the group consisting of a pattern identification detector, a color discrimination detector, and an edge detector, where a color or visual pattern is placed on or near the spout end to facilitate distinguishing spout data from background pixel data.

15. The system according to claim 14 wherein the spout module determines the range of the pixels to the imaging device to estimate coordinates of a spout end of the spout.

16. The system according to claim 14 wherein the spout module does not use a spout angle sensor for detecting an angle of the spout with respect to the transferring vehicle for estimating a position of the spout end relative to the storage portion.

17. The system according to claim 1 further comprising:
an actuator to direct a spout angular orientation in the cooperative alignment such that a spout end of the spout is aligned with the central zone or the target zone of the storage portion.

18. The system according to claim 1 wherein the target alignment is based on image processing of collected image data associated with the target spatial offset between the spout and the container perimeter.

19. The system according to claim 18 wherein the collected image data comprises additional image data that is not impacted or impaired by dust.

\* \* \* \* \*